United States Patent [19]
Ishizuka et al.

[11] Patent Number: 5,146,085
[45] Date of Patent: Sep. 8, 1992

[54] ENCODER WITH HIGH RESOLVING POWER AND ACCURACY

[75] Inventors: Koh Ishizuka, Urawa; Tetsuharu Nishimura, Kawasaki, both of Japan

[73] Assignee: Canon Kabushiki Kaisha, Tokyo, Japan

[21] Appl. No.: 522,051

[22] Filed: May 11, 1990

[30] Foreign Application Priority Data

May 12, 1989 [JP] Japan .................................. 1-120046
May 12, 1989 [JP] Japan .................................. 1-120047

[51] Int. Cl.$^5$ ........................... G01D 5/34; H01J 3/14
[52] U.S. Cl. ........................ 250/231.16; 250/237 G; 356/356
[58] Field of Search ................. 250/231.16, 231.14, 250/237 G; 356/356, 358, 373–374; 33/707

[56] References Cited

U.S. PATENT DOCUMENTS

| | | | |
|---|---|---|---|
| 4,629,886 | 12/1986 | Akiyama et al. | 250/237 |
| 4,676,645 | 6/1987 | Taniguchi et al. | 356/356 |
| 4,794,251 | 12/1988 | Scholsan | 250/237 G |
| 4,829,342 | 5/1989 | Nishimura | 356/356 |
| 4,868,385 | 9/1989 | Nishimura | 250/231.16 |
| 4,930,895 | 6/1990 | Nishimura et al. | 356/356 |
| 4,967,072 | 10/1990 | Nishimura | 356/356 |
| 4,970,388 | 11/1990 | Nishimura et al. | 250/231.16 |
| 4,975,570 | 12/1990 | Nishimura et al. | 250/237 G |
| 5,011,287 | 4/1991 | Mino | 356/356 |

FOREIGN PATENT DOCUMENTS 2185314 7/1987 United Kingdom .

OTHER PUBLICATIONS

Patent Abstracts of Japan, vol. 10, No. 229, Aug. 8, 1986, JP-A-61 65 115, Apr. 3, 1986.

Primary Examiner—David C. Nelms
Assistant Examiner—Michael Messinger
Attorney, Agent, or Firm—Fitzpatrick, Cella, Harper & Scinto

[57] ABSTRACT

A light beam is incident on a first position on a scale at such an angle that diffracted lights substantially coincide with an incident optical path, and two diffracted lights are directed along a substantially common optical path and are incident on a second position symmetrical with the first position. An interference light formed by rediffracted lights reflected from the second position is detected to thereby detect the displaced state of the scale.

10 Claims, 12 Drawing Sheets

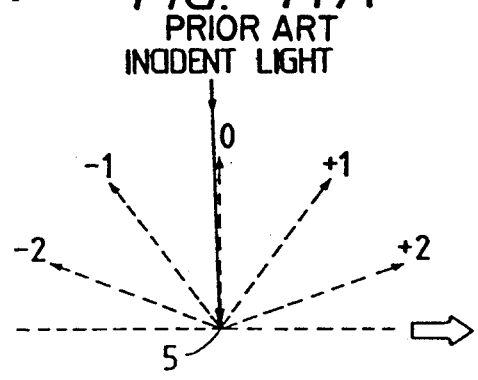
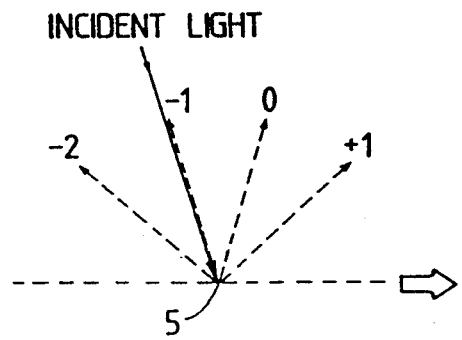
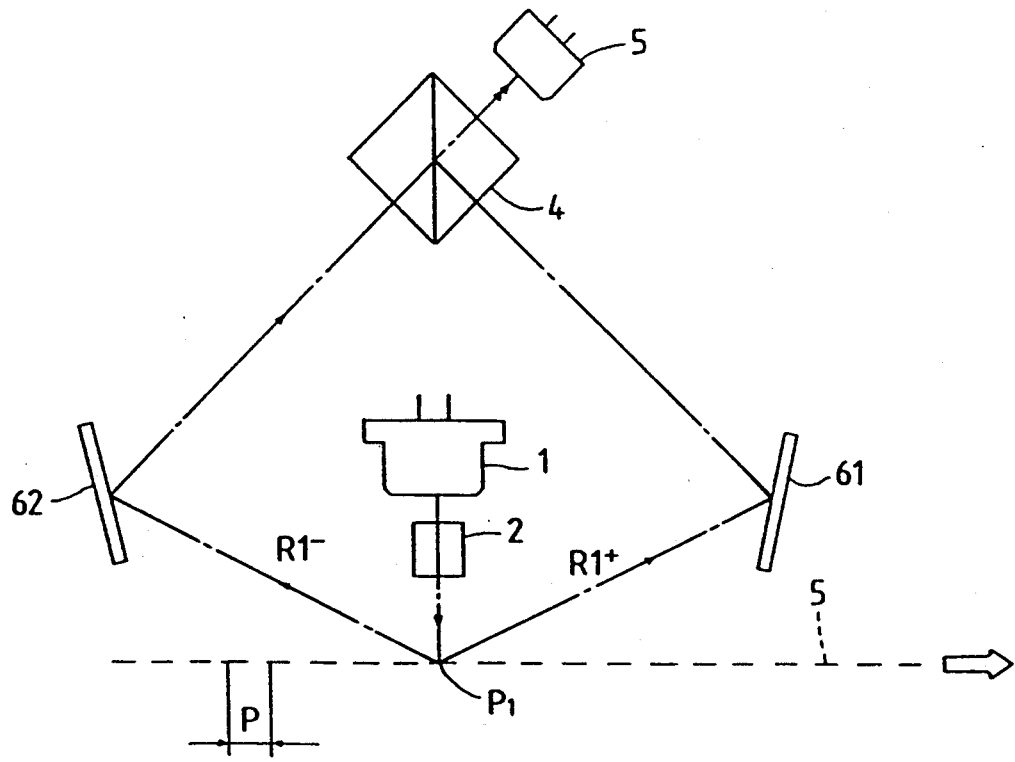

ENCODER WITH HIGH RESOLVING POWER AND ACCURACY

BACKGROUND OF THE INVENTION

1. Field of the Invention

This invention relates to an encoder, and particularly to an encoder for detecting the relative displacement of a diffraction grating and a light beam incident on the diffraction grating by photoelectrically converting an interference light formed by causing several diffracted lights emerging from the diffraction grating to interfere with one another.

2. Related Background Art

Heretofore, in an NC machine tool or the like, an encoder has been used as a sensor for detecting the position or the angular displacement of an object to be examined. In recent years, a high resolving power and high accuracy have been required of encoders of this type.

An encoder of high resolving power and high accuracy in which a diffraction grating is used as an optical type scale for displacement detection and the recording density of the diffraction grating is several microns/pitch and several diffracted lights emerging from the diffraction grating are caused to interfere with one another to thereby obtain a periodic signal conforming to the displacement of the scale is already known. However, for higher accuracy and higher resolving power, the recording density of the diffraction grating is increased to the wavelength order, the angle of diffraction (the angle of emergence from the diffraction grating) of the diffracted lights will become greater, and this gives rise to a problem that the arrangement of optical parts become cumbersome.

For example, a prior-art encoder shown in FIG. 15 of the accompanying drawings generates a signal conforming to the displacement of a scale by an operation as will be described hereinafter.

A light beam from a laser diode 1 is collimated by a collimator lens 2 and is caused to be vertically incident on a point Pl on a light reflecting type diffraction grating 5, and +1st-order reflected diffracted light (R1+) emerging from the point P1 is returned to a beam splitter 4 via a mirror 61 and at the same time, −1st-order reflected diffracted light (R1−) emerging from the point P1 is returned to the beam splitter 4 via a mirror 62, and ±1st-order reflected diffracted lights are superposed one upon the other through the beam splitter 4 and are caused to interfere with each other. By the principle that while the diffraction grating 5 is moved by an amount corresponding to 1 grating pitch, the phase of the wave surface of +1st-order diffracted light is "advanced by $2\pi$" and the phase of the wave surface of −1st-order diffracted light is "delayed by $2\pi$", a variation in light and shade of two periods is observed by a light receiving element S in conformity with the movement by 1 grating pitch by virtue of an interference light formed by causing the two lights to interfere with each other. That is, a periodic signal double the number of the gratings of the diffraction grating 5 can be taken out.

However, as previously described, the greater the recording density (pitch) of the diffraction grating 5 becomes, the greater the angle of diffraction of the diffracted light becomes and therefore, the angle of emergence of the diffracted light emerging from the diffraction grating 5 becomes approximately 90°. Accordingly, mirrors 61 and 62 must be installed proximate to the diffraction grating 5 so as not to be in contact with the diffraction grating 5, and such installation is very cumbersome. Further, if the grating pitch of the diffraction grating 5 is made less than the wavelength of the light beam from the laser diode 1, the diffracted light cannot be taken out and it becomes impossible even to detect any variation in the diffraction grating 5.

A linear encoder and a rotary encoder are known as the above-described encoder, and a conventional example of the rotary encoder will hereinafter be described. The rotary encoder is such that a diffraction grating is provided on the circumference of a disk (scale) connected to a rotational body, a laser light is applied to the diffraction grating, diffracted lights produced by the diffraction grating are caused to interfere with each other, and a variation in the light and shade of the interference light is detected to thereby detect the angle of rotation and the speed of rotation of the disk.

FIGS. 16A and 16B of the accompanying drawings show the construction of a prior-art rotary encoder described in Japanese Laid-Open Patent Application No. 63-91515. In these figures, the reference numeral 1 designates a laser, the reference numeral 2 denotes a scale having a light transmitting type diffraction grating, the reference numeral 3 designates a reflecting prism, the reference numeral 4 denotes a polarizing prism, the reference numerals 51 and 52 designate light receiving elements, and the reference numeral 6 denotes the rotary shaft of the scale 2. In FIG. 16A, a light beam emitted from the laser 1 is substantially vertically incident on a position M1 on the diffraction grating 2. ±1st-order diffracted lights created at the position M1 are reflected at a right angle by a first right-angled reflecting surface 3a of the reflecting prism 3, and are totally reflected twice by the sides 3c and 3d of the reflecting prism 3, and thereafter are again reflected at a right angle by a second right-angled reflecting surface 3b of the reflecting prism 3 and are caused to be incident on a position M2 on the diffraction grating 2. FIG. 16B illustrates the optical path in the reflecting prism 3, and is a plan view as it is seen from the underside of FIG. 16A. As shown in FIG. 16B, ±1st-order diffracted lights created at the position M1 emerge at angles of diffraction $\alpha+$ and $\alpha-$, respectively, and are totally reflected by the sides 3c and 3d of the reflecting prism 3. They intersect each other near the center of the reflecting prism 3, are further totally reflected by the sides 3c and 3d, and are incident on a position M2 on the diffraction grating 2 at the same angles as the aforementioned angles of diffraction $\alpha+$ and $\alpha-$. Thereupon, the ±1st-order rediffracted lights at the position M2 are superposed one upon the other in parallel to and in the opposite direction to the incident light from the laser 1 at the position M1, and emerge from the diffraction grating 2. These ±1st-order rediffracted lights which have interfered with each other are received by the light receiving elements 51 and 52 through the polarizing prism 4. The ±1st-order diffracted lights have their phases varied by ±$2\pi$ when the diffraction grating 2 is rotated by an amount of 1 grating pitch. Likewise, the ±1st-order rediffracted lights have their phases varied by ±$4\pi$ by the rotation of 1 grating pitch. Accordingly, when as shown in FIGS. 16A and 16B, the ±1st-order rediffracted lights are caused to interfere with each other, a sine wave signal corresponding to four periods is obtained from the light receiving elements 51 and 52 for the rotation of the scale 2 by an amount corresponding to 1 grating pitch. If the total number of the gratings is N, a sine wave signal corresponding to 4N periods is obtained for one full rotation. In FIGS. 16A and 16B, M1 and M2 are in a positional relation point-symmetrical with each other with respect to the center of rotation of the rotary shaft 6, whereby no measurement error will occur even if there is some eccentricity during the mounting of the scale 2 onto the rotary shaft 6. Further, from the light receiving elements 51 and 52, 90° phase difference signals are obtained by a combination of the rectilinearly polarized light of the laser 1, the elliptically polarized light by the total reflection in the reflecting prism 3 and the polarizing prism 4 so that the direction of rotation of the diffraction grating 2 can also be discriminated.

In the example of the prior art constructed as described above, the problem as previously described arises if the pitch of the grating is made fine. In addition to this, the following problems also arise:

(1) The ±1st-order diffracted lights which are caused to interfere with each other pass along discrete optical paths in the reflecting prism 3. Therefore, the optical path is made to deviate or the length of the optical path is varied by an environmental change such as a change in the ambient temperature and a measurement error is liable to occur. Particularly, the greater the diameter of the scale 2 becomes, the longer the optical path in the reflecting prism 3 becomes, i.e., the non-common optical path, and an error is more liable to occur. Also, if the oscillation wavelength of the laser varies for such an environmental change, the optical paths of ±1st-order diffracted lights will vary and the ±1st-order diffracted light will not be incident on the position M2.

(2) If the diffraction grating forming surface of the scale 2 is inclined relative to the rotary shaft 6, the diffracted lights created at M1 will not be again incident on M2 and therefore, a measurement error will occur under the influence of the aforementioned eccentricity.

SUMMARY OF THE INVENTION

It is an object of the present invention to eliminate the above-noted problems peculiar to the prior art and to provide a rotary encoder of high accuracy in which it is difficult for a measurement error attributable to an environmental change or the inclination of a scale or the like to occur.

It is a further object of the present invention to provide an encoder in which optical arrangement is easy and which is simple in construction.

BRIEF DESCRIPTION OF THE DRAWINGS

FIGS. 14A and 14B illustrate the manner in which the ± signs of the orders of diffracted lights are given.

FIGS. 15, 16A and 16B illustrate an example of the encoder according to the prior art.

DESCRIPTION OF THE PREFERRED EMBODIMENTS

Some embodiments of the present invention will hereinafter be described with reference to the drawings.

Figure 1:
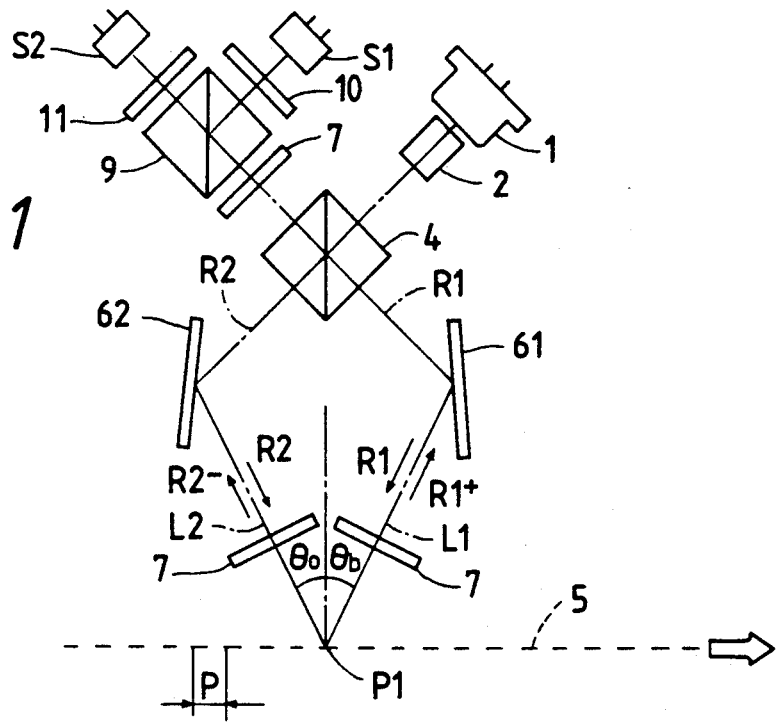
FIG. 1 is a schematic view showing an embodiment of the present invention.

In FIG. 1, the reference numeral 1 designates a light source comprising a laser diode, the reference numeral 2 denotes a collimator lens, the reference numeral 4 designates a beam splitter, the reference numeral 5 denotes a diffraction grating having a pitch P formed on a linear scale or a rotary scale, the reference numerals 61 and 62 designate mirrors, the reference numeral 7 denotes quarter wavelength plates, the reference numeral 9 designates a non-polarizing beam splitter, the reference numerals 10 and 11 denote polarizing elements (such as polarizing plates or polarizing beam splitters), and the reference characters S1 and S2 designate light receiving elements. A laser beam of wavelength $\lambda$ emitted from the light source 1 is collimated by the collimator lens 2, and the parallel light beam is caused to enter the polarizing beam splitter 4, whereby it is divided into two light beams R1 and R2 whose polarization azimuths are orthogonal to each other. The light beam R1 is an S-polarized light reflected by the polarizing beam splitter 4, and the light beam R2 is a P-polarized light transmitted through the polarizing beam splitter 4. The light beam R1 travels along an optical path L1 formed via the mirror 61, and the light beam R2 travels along an optical path L2 formed via the mirror 62. The light beams R1 and R2 pass through the quarter wavelength plates 7, whereafter they are incident on a point P1 on the diffraction grating 5 at an angle of incidence $\theta_0 \theta_b [= \sin^{-1}(\lambda/2O)]$, and light beams $R_1$ and $R_2$ are obtained by being reflected and diffracted by the diffraction grating 5. The ±1st-order diffracted light (R1+) of the light beam R1 and the −1st-order diffracted light (R2−) of the light beam R2 travel toward the original optical paths L1 and L2, respectively, through the quarter wavelength plates 7. The +1st-order diffracted light travelling reversely along an optical path L1 and the −1st-order diffracted light travelling reversely along an optical path L2 are reflected by the mirrors 61 and 62, respectively, and are directed to the polarizing beam splitter 4, and are again superposed one upon the other by the polarizing beam splitter 4. The +1st-order diffracted light is made into a P-polarized light by the action of the quarter wavelength plate 7 and the −1st-order diffracted light is made into an S-polarized light by the action of the quarter wavelength plate 7 and therefore, these light beams emerge from the polarizing beam splitter 4 while overlapping with each other, without any loss. The overlapping two light beams pass through the quarter wavelength plate 7 and become circularly polarized lights whose planes of polarization rotate in opposite directions to each other and therefore, the polarized state of a light beam comprising a complex of these circularly polarized lights rotating in opposite directions to each other is rectilinear polarization. The azimuth of polarization of this light beam is determined by the phase difference between the wave surfaces of the light beam (R1+) and light beam (R2−) which vary in conformity with the displacement of the diffraction grating 5, and while the phase difference varies to 0, $\frac{1}{4}\pi$, $2/4\pi$, $\frac{3}{4}\pi$, $4/4\pi$, $5/4\pi$, ..., $8/4\pi$, the azimuth of polarization of this rectilinearly polarized light beam rotates by 45°, 67.5°, 90°, 112.5°, 135°, 157.5°, ..., 225° (45°). So, if after this light beam is divided into two light beams equal in quantity of light by the non-polarizing beam splitter 9, only a particular polarized component is separated and taken out from one of the two light beams by the use of the polarizing element 10 and is caused to enter the light receiving element S1, and only a particular polarized component is separated and taken out from the other light beam by the use of the polarizing element 11 and is caused to enter the light receiving element S2, periodic signals are output from the light receiving elements S1 and S2, respectively, in conformity with the displacement of the scale. Here, if the azimuths of the polarized components taken out by the use of the polarizing elements 10 and 11 are made to deviate by 45° from each other, the timings of the variation in light and shade of the interference lights entering the light receiving elements S1 and S2 deviate by $\frac{1}{4}$ period ($\frac{1}{2}\pi$ in terms of the phase of the output signal) from each other. Accordingly, by electrically amplifying and binarizing these periodic signals of two phases which are 90° out of phase with each other, the amount of displacement and the direction of displacement of the diffraction grating 5 can be detected. This detection method is a well-known technique and therefore need not be specifically described herein.

According to the present encoder, even if the pitch of the diffraction grating 5 becomes equal to the wavelength λ of the light beam from the light source 1, the angle of incidence of the light beams R1 and R2 becomes $\theta_0 = 30°$ and the angle of emergence of the ±1st-order diffracted lights (R1+, R2−) becomes the angle of emergence $\simeq 30°$, and the ± 1st-order diffracted lights for forming an interference light can be easily taken out. Also, the construction of the optical system is very simple.

Figure 2:
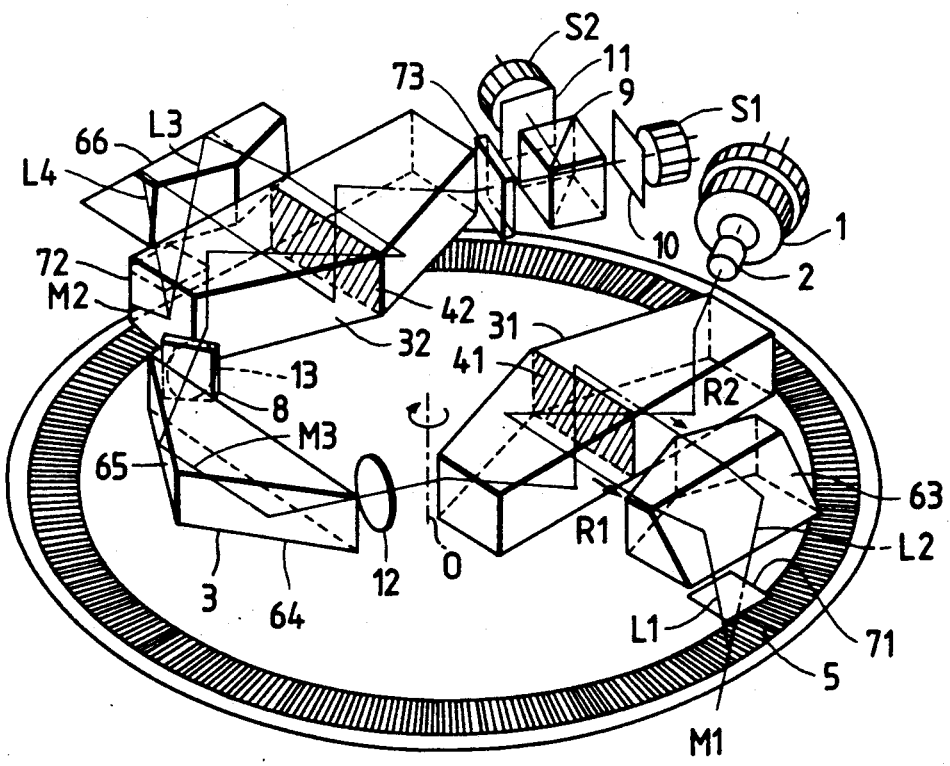
FIG. 2 is a perspective view showing an embodiment in which the present invention is applied to a rotary encoder.

Referring to FIG. 2 which is a perspective view showing an embodiment in which the present invention is applied to a rotary encoder, the reference numeral 1 designates a light source comprising a laser diode, the reference numeral 2 denotes a collimator lens, the reference numerals 31 and 32 designate prisms, the reference numerals 41 and 42 denote polarizing beam splitter surfaces in the prisms 31 and 32, the reference numeral 5 designates a rotary disk plate (diffraction grating), the reference numerals 63, 64, 65 and 66 denote mirrors, the reference numerals 71, 72 and 73 designate quarter wavelength plates, the reference numeral 8 denotes a half wavelength plate, the reference numeral 9 designates a non-polarizing beam splitter, the reference numerals 10 and 11 denote polarizing elements (for example, polarizing plates or polarizing prisms), and the reference characters S1 and S2 designate light receiving elements.

A laser beam of wavelength λ emitted from the light source 1 is collimated by the collimator lens 2, and the parallel light beam is caused to enter the prism 31 and is divided into two light beams R1 and R2 travelling along symmetrical optical paths L1 and L2 by the mirror surface or the polarizing beam splitter surface 41 provided at a predetermined location in the prism 31, and the respective light beams R1 and R2 are reflected by the mirror 63 and are caused to pass through the quarter wavelength plate 71, and then are caused to be incident at a time on a first point (P1) on the radial diffraction grating of grating pitch P provided on the rotary disk plate 5. Here, as in FIG. 1, the angle of incidence $\theta_0$ of the light beams R1 and R2 are preset to $\theta_0 = \sin^{-1}(\lambda/2P)$ so that of a plurality of diffracted lights diffracted by the diffraction grating and emerging from the point P1, the +1st-order reflected diffracted light of the light beam R1 and the −1st-order reflected diffracted light by the light beam R2 may emerge in directions in which they travel reversely along the original optical paths L1 and L2, respectively. Also, the light beams R1 and R2 become rectilinearly polarized light whose planes of polarization are orthogonal to each other at a point of time whereat they have been divided by the polarizing beam splitter surface 41, but the planes of polarization of the light beams R1 and R2 replace each other by reciprocally passing through the quarter wavelength plate 71. The action of this quarter wavelength plate 71 is similar to that of the two quarter wavelength plates 7 in the embodiment of FIG. 1, and since the light beam R1 is a rectilinearly polarized light (P-polarized light) transmitted through the polarizing beam splitter surface 41, the +1st-order diffracted light (R1+) of the light beam R1 becomes an S-polarized light through the quarter wavelength plate 71, is reflected by the polarizing beam splitter surface 41 and emerges from the prism 31. Since the light beam R2 is a rectilinearly polarized light (S-polarized light) reflected by the polarizing beam splitter surface, the −1st-order diffracted light (R2−) of the light beam R2 becomes a P-polarized light through the quarter wavelength plate 71, and is transmitted through the polarizing beam splitter surface 41 and emerges from the prism while overlapping with the light beam (R1+). The +1st-order diffracted light (R1+) of the light beam R1 and the −1st-order diffracted light (R2−) of the light beam R2 are transmitted by the mirrors and 65 of the prism 3 while overlapping with each other, are transmitted through the half wavelength plate 8 and enter the prism 32. The light beam (R1+) is caused to travel along an optical path L3 and the light beam (R2−) is caused to travel along an optical path L4, by the mirror surface or the polarizing beam splitter surface 42 provided at a predetermined location in the prism 32, and these light beams are reflected by the mirror 66 and are caused to pass through the quarter wavelength plate 72, whereafter they are caused to be incident at an angle $\theta_0$ on a second point (P2) on the radial diffraction grating provided on the rotary disk plate 5. Here, the half wavelength plate 8 converts the plane of polarization of the +1st-order diffracted light (R1+) from S-polarized light into P-polarized light, and converts the plane of polarization of the −1st-order diffracted light (R2−) from P polarized light into S-polarized light. Also, the points P1 and P2 are set to a positional relation point-symmetrical with respect to the axis of rotation O of the rotary disk plate 5. Of a plurality of reflected diffracted lights reflected and diffracted by the diffraction grating and emerging from the point P2, the +1st-order rediffracted light (R1+ +) of the light beam (R1+) travels reversely along the original optical path L3, again passes through the quarter wavelength plate 72, becomes an S-polarized light, is reflected by the polarizing beam splitter surface 42 in the prism 32 and emerges from the prism 32. On the other hand, the −1st-order rediffracted light (R2− −) of the light beam (R2−) travels reversely along the original optical path L4, is again transmitted through the quarter wavelength plate 72, becomes a P-polarized light, is transmitted through the polarizing beam splitter surface 42 in the prism 32, overlaps with the +1st-order rediffracted light (R1++) and emerges from the prism 32. The two light beams which have overlapped with each other pass through the quarter wavelength plate 73, whereby they become circularly polarized lights whose planes of polarization rotate in opposite directions and therefore, the polarized state of a light beam comprising a complex of these circularly polarized lights which rotate in opposite directions becomes rectilinear polarization. The azimuth of polarization of this rectilinearly polarized light beam is determined by the phase difference between the wave surfaces of the +1st-order rediffracted light (R++) and the −1st-order rediffracted light (R2−−) varying in conformity with the rotation of the rotary disk plate 5, and while the phase difference varies to 0, $\pi/4$, $2\pi/4$, $3\pi/4$, $4\pi/4$, $5\pi/4$, ..., $8\pi/4$, the azimuth of polarization of the rectilinearly polarized light beam rotates by 45°, 67.5°, 90°, 112.5°, 135°, 157.5°, ..., 225° (45°). So, if after this light beam is divided into two light beams equal in quantity amount by the non-polarizing beam splitter 9, only a particular polarized component of one of the two light beams is separated and taken out by the use of the polarizing element 10 and is caused to enter the light receiving element S1 and only a particular polarized component of the other light beam is separated and taken out by the use of the polarizing element 11 and is caused to enter the light receiving element S2, periodic signals conforming to the amount of rotation of the rotary disk plate 5 are output from the light receiving elements S1 and S2, respectively. Here, if the polarized components taken out by the use of the polarizing elements 10 and 11 are caused to deviate by 45° from each other, the timings of the variation in the light and shade of the interference lights entering the light receiving elements S1 and S2 deviate by a quarter period ($\pi/2$ in terms of the phase of the output signal) from each other. Accordingly, if as in the embodiment of FIG. 1, these two-phase periodic signals which are 90° out of phase with each other are amplified and binarized, the angle of rotation and the direction of rotation of the rotary disk plate can be detected.

In the rotary encoder of the present embodiment shown in FIG. 2, the optical path L1 when the light beam R1 enters the diffraction grating and the optical path along which the +1st-order reflected diffracted light R1+ of the light beam R1 emerges and travels are set substantially equally and the optical path L2 when the light beam R2 enters the diffraction grating and the optical path along which the −1st-order reflected diffracted light R2− of the light beam R2 emerges and travels are set substantially equally, and this condition is also satisfied with respect to the optical paths L3 and L4 of the ±1st-order reflected diffracted lights and the optical paths of the ±1st-order rediffracted lights and therefore, even if the grating pitch P of the radial diffraction grating of the rotary disk plate 5 becomes the same degree of small value as the wavelength $\lambda$ of the light beam from the light source 1, the angles of incidence of the light beams R1 and R2 on the points M1 and M2 and the angles of emergence of the ±1st-order diffracted lights and the ±1st-order rediffracted lights can be of the order of 30°. Accordingly, unlike the prior-art encoder, the fine grating pitch P has no difficulty reflecting the diffracted light, and an encoder of high resolving power is constructed.

Also, in the present embodiment, the lens 12, the lens 13, the mirror 61 and the mirror 62 provided in the optical path in which the +1st-order diffracted R1+ and the −1st-order diffracted light R2-light overlap with each other, i.e., the path of the two light beams which links the polarizing beam splitter surfaces 41 and 42 together, are disposed so as to satisfy the following conditions.

First, the finite area centered about the point M1 on the rotary disk plate 5 is imaged on the finite area centered about the point M3 by the lens 12, and further the finite area centered about the point M3 is imaged on the finite area centered about the point M2 on the disk plate 5 by the lens 13. By this condition, a light beam emerging from the point M1 at any angle can be made to be incident on the point M2 without fail unless it is intercepted on the way. That is, in the present embodiment, the point M1 and the point M2 are made optically conjugate with each other by an optical system having the lens 12, the lens 13, the mirror 61 and the mirror 62. Thereby, deterioration of measurement accuracy is prevented.

Next, the other reflecting surfaces such as the mirror 64, the mirror 65 and the mirrors 63 and 66 are disposed so that when the optical path of the diffracted light (R1+) emerging from the point M1 deviates by an angle $\Delta\theta_{15}$ (the angles $\Delta\theta x_{15}$ and $\Delta\theta y_{15}$ when the light beam is decomposed into x and y components) from the optical path L1 and the diffracted light travels along an optical path L5 differing from the optical path L1, the light may enter with the angle of incidence of an optical path L7 entering the point M2 deviating by $-\Delta\theta x_{15}$ and $-\Delta\theta y_{15}$ as compared with the preset optical path L3. This also holds true of the diffracted light (R2−). By this condition, the azimuths of emergence of the ±1st-order rediffracted lights emerging from the point M2 become constant irrespective of the position or posture of the rotary disk plate 5, and the optical paths of the ±1st-order rediffracted lights over-lapping with each other in the polarizing beam splitter 42 become always parallel to each other and therefore, a signal obtained by photoelectrically converting the interference light resulting from the overlapping of the ±1st-order rediffracted lights (R1++) and (R2−−) becomes stable.

This will be verified below.

Figure 3:
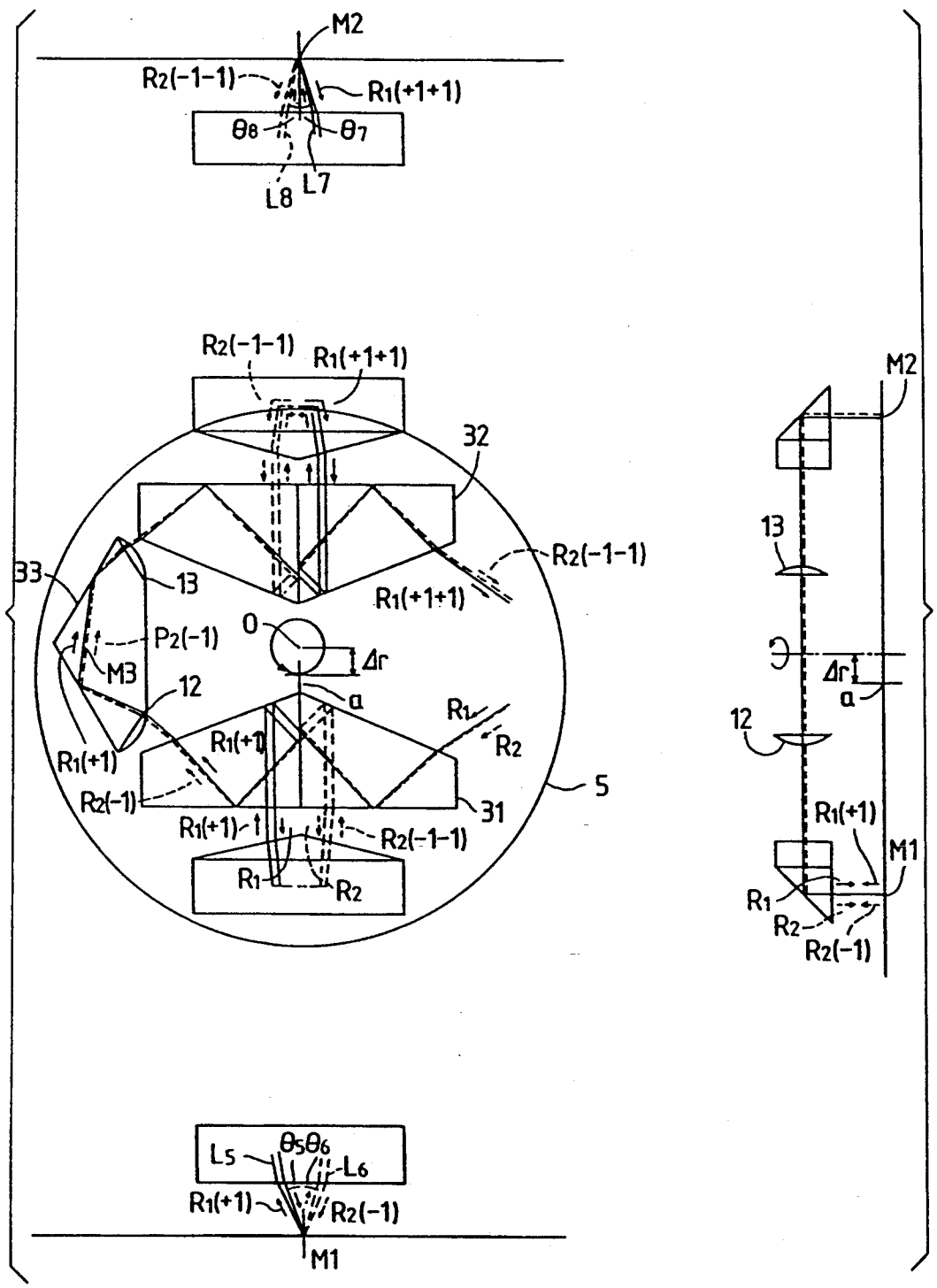
FIGS. 3, 4, 5A, 5B, 6, and 7 illustrate the manner of optical path correction when there is the mounting error of the rotary disk plate of the rotary encoder of a first embodiment.

The deviation of the optical path when the axis of rotation O (the center of rotation) of the rotary disk plate 5 and the center of the radial diffraction grating deviate by $\Delta r$ from each other will first be described with reference to FIGS. 3 and 4. The center of the radial diffraction grating on the rotary disk plate 5 moves around the axis of rotation O with the rotation of the rotary disk plate 5, and the pitch of the diffraction grating at the point M1 fluctuates periodically. When as shown in FIG. 3, the center of the radial grating is at a point a, the pitch of the diffraction grating at the point M1 becomes finer by $\Delta p$. ($=2\pi\Delta r/N$, N being the number of radial diffraction gratings) and the pitch of the diffraction grating at the point M2 becomes thicker by $\Delta p$ and therefore, the +1st-order diffracted light (R1+) of the light beam R1 emerging from the point M1 and the −1st-order diffracted light (R2−) of the light beam R2 have their angles of emergence relative to the rotary disk plate 5 becoming angles of emergence $\downarrow_5$ and $\theta_6$ greater by $\Delta\theta x$ than the angles of incidence $\theta_1$ and $\theta_2$ ($\theta_1 = \theta_2 = \theta_0$) of the optical paths L1 and L2, and travel along an optical path L5 or L6 deviating from the optical path L1 or L2 and return to the prism 31. Each light beam emerges from the prism 31 and enters a position deviated from the center (the optic axis) of the lens 12, but travels toward the point M3 by the action of the lens 12. The ±1st-order diffracted lights (R1+ and R2−) which have passed the point M3 pass through a half wavelength plate 8 (not shown), whereafter they have their travel paths bent by the lens 13 and travel along optical paths L7 and L8 via the prism 32, and enter the point M2 at angles of incidence $\theta_7$ and $\theta_8$ smaller by $\Delta\theta x$ than $\theta_3$ and $\theta_4$ ($\theta_3=\theta_4=\theta_0$). Since the pitch of the diffraction grating at the point M2 is thicker by $\Delta p$, for example, the angle of emergence $\theta++$ of the +1st-order diffracted light (R1++) of the light beam (R1+) is $$\theta++ = \sin^{-1}\{\lambda/(p+\Delta p) - \sin\theta_7\}, \text{ and}$$

when $$\theta_5 = \sin^{-1}\{\lambda/(p-\Delta p) - \sin\theta_1\}$$

$$\theta_7 = 2\theta_1 - \theta_5$$

are substituted for $\theta++$, $$\begin{aligned}
\sin\theta++ &= \lambda/(p+\Delta p) - \\
&\quad \sin[2\theta_1 - \sin^{-1}\{\lambda/(p-\Delta p) - \sin\theta_1\}] \\
&= \lambda/(p+\Delta p) - \sin 2\sin^{-1}(\lambda/2p) - \\
&\quad \sin^{-1}\{\lambda/(p-\Delta p) - \lambda/2p\}] \\
&= \lambda/(p+\Delta p) - \\
&\quad [2(\lambda/2p) - \{\lambda/(p-\Delta p) - \lambda/2p\}] \\
&= \lambda/2p,
\end{aligned}$$

that is $\theta++ = \theta_1 = \theta_3$ adn thus, the azimuth of travel (the direction of emergence) of the +1st-order rediffracted light (R1++) emerging from the point M2 is kept constant. The azimuth of travel (the direction of emergence) of the −1st-order rediffracted light (R2−−) is also kept constant for the same reason.

Figure 4:
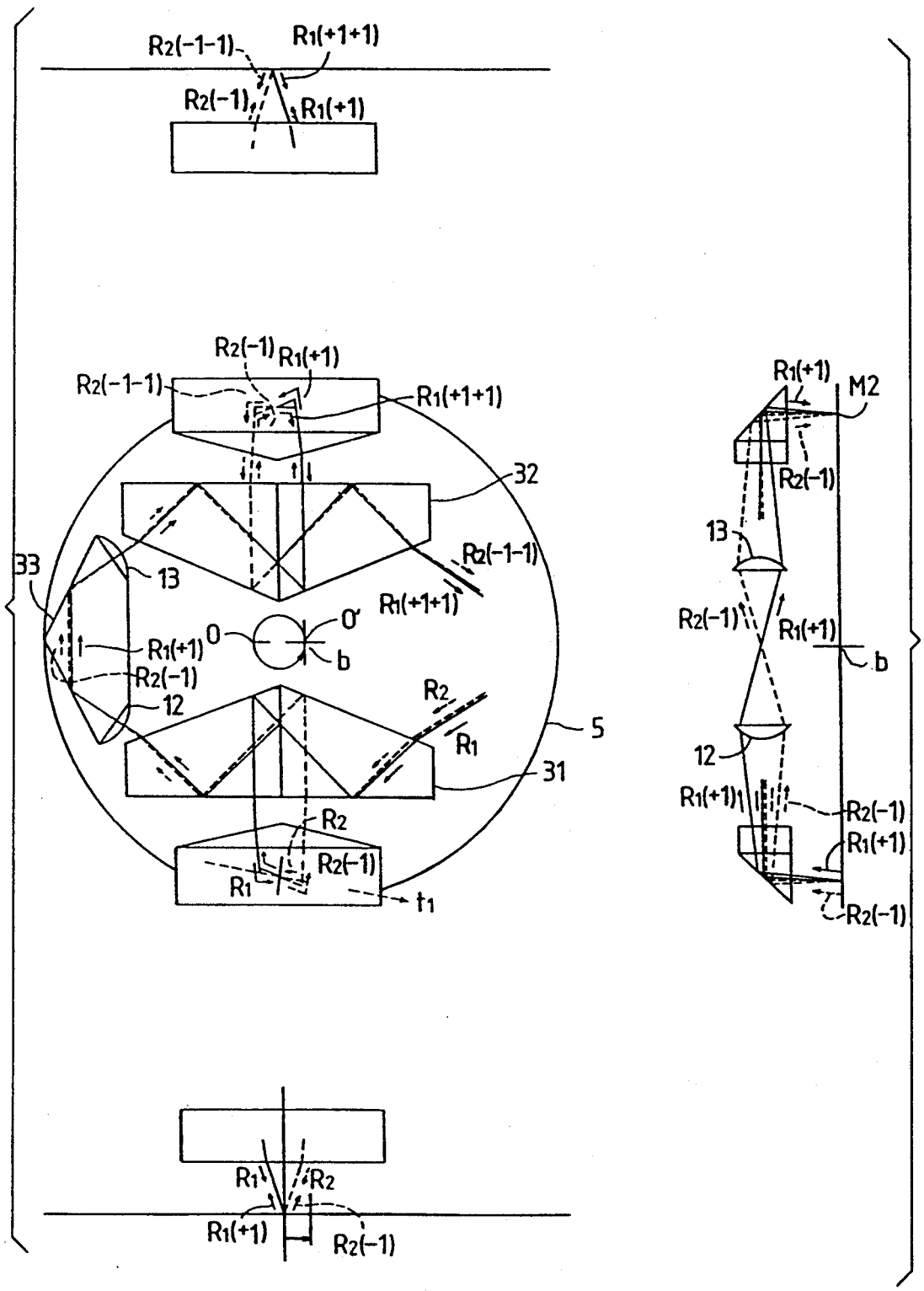
Figure 5A:
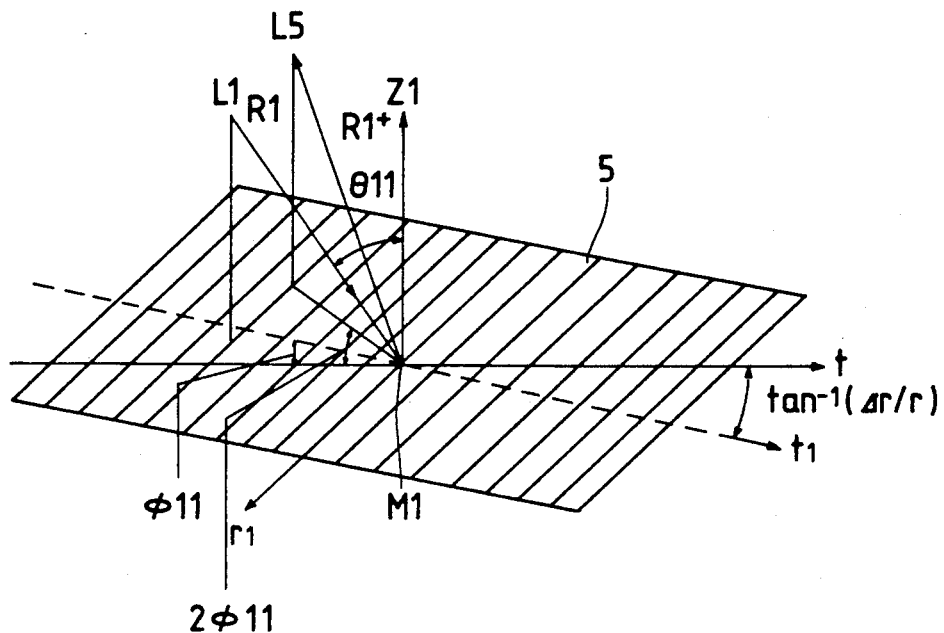
Figure 5B:
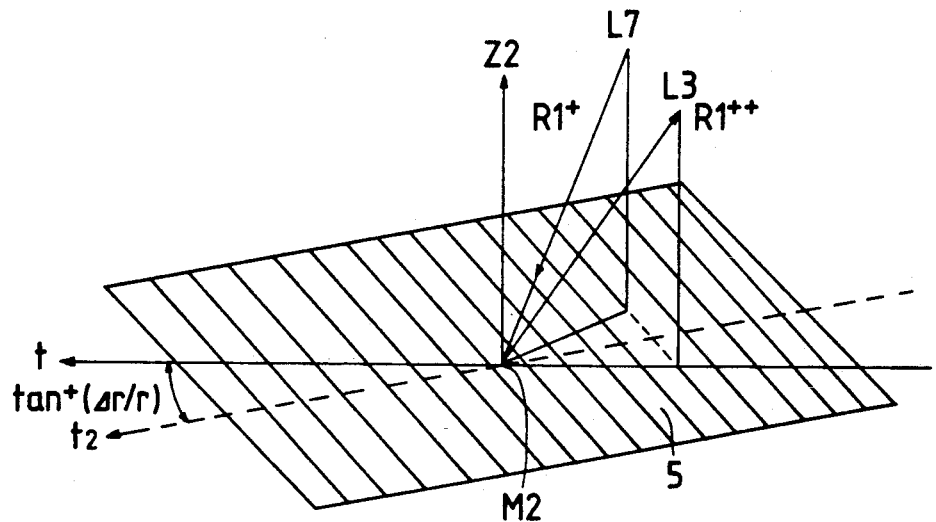

Next, when as shown in FIG. 4, the center of the radial diffraction grating is at a point b, the parameters $\theta_1$ and $\phi_1$ of the incident light beam in the coordinates system (t, r, z) (see FIG. 5) are $$\theta_1 = \theta_0$$

$$\phi_1 = 0,$$

but the azimuth of arrangement (the t axis) of the diffraction grating at the point M1 deviates by $\tan^{-1}(\Delta\Delta r/r)$ in terms of angle and becomes the $t_1$ axis and therefore, the relation between the light beam R1 incident on the diffraction grating and the diffraction grating is as shown in FIG. 5. In FIG. 5, $\theta_{11}$ represents the angle of incidence of the light beam onto the rotary disk plate 5, and $\phi_{11}[=\tan^{-1}(\Delta r/r)]$ represents the angle with respect to the azimuth of arrangement (the $t_1$ axis) of the diffraction grating. Also, when the $z_1$ axis and the $r_1$ axis are determined as shown in FIG. 5 and the angles formed between the optical path L1 of the incident light beam and the coordinates axis are defined as $\alpha_{11}$, $\beta_{11}$ and $\gamma_{11}$, $$\cos\alpha_{11} = \sin\theta_{11} \cdot \cos\phi_{11} \quad (1)$$

$$\cos\beta_{11} = \sin\theta_{11} \cdot \sin\phi_{11} \quad (2)$$

$$\gamma_{11} = \theta_{11} = \theta_1. \quad (3)$$

So, these equations may be substituted for the following equations for finding the azimuth of emergence of the nth-order diffracted light in the coordinates system ($t_1$, $r_1$, $z_1$), and further, $$\begin{aligned}
\theta_{12} &= \cos^{-1}\{(1 - \cos^2\alpha_{12} - \cos^2\beta_{12})^{\frac{1}{2}}\} \\
\phi_{12} &= \tan^{-1}(\cos\beta_{12}/\cos\alpha_{12}) \\
&\quad (\alpha_{12} < 90) \\
&= \tan^{-1}(\cos\beta_{12}/\cos\alpha_{12}) + 180 \\
&\quad (\alpha_{12} > 90) \\
&= 90 \quad (\alpha_{12} < 90, \beta_{12} = 0) \\
&= -90 \quad (\alpha_{12} > 90, \beta_{12} = 0)
\end{aligned}$$

may be calculated. Here, when $\Delta r$ is sufficiently small as compared with r and the angle of incidence of the light beam R1 at the point M1 is $\theta_0[=\sin^{-1}\lambda\cdot N/(2\pi r)]$, it can be immediately found by calculation that the parameters $\theta_5$ and $\phi_5$ of the azimuth of emergence of the diffracted light (R1+) in the coordinates system (t, r, z) are $$\theta_5 = \theta_{12} = \theta_1$$

$$\phi_5 = \phi_{12} = -2\cdot\phi_{11}$$

and therefore, the angle formed with respect to the t axis when as shown in FIG. 3, the optical path L5 of the +1st-order diffracted light (R1+) of the light beam R1 is projected onto the surface of the disk deviates by $-2\cdot\phi_{11}$, and when that light beam is incident on the point M2, the angle formed with respect to the t axis when the optical path L7 of the incident light beam is projected onto the grating arrangement surface (the t−r plane) of the rotary disk plate 5 deviates by $-2\cdot\phi_{11}$ due to a combination of the lens 12, the lens 13, the mirror 64, the mirror 65 and other reflecting surfaces and thus, the angle formed with respect to the t axis when the +1st-order diffracted light (R1++) of that light beam is projected onto the grating arrangement surface of the rotary disk plate is restored to 0. That is, it completely coincides with the optical path L3. The optical path of the −1st-order diffracted light (R2−−) emerging from the point M2 after the −1st-order diffracted light (R2−) of the light beam R2 emerges from the point M1 and is incident on the point M2 also completely coincides with the optical path L4 for a similar reason.

The manner of correction of the optical path when the axis of rotation 0 of the rotary disk plate 5 and a normal to the grating arrangement surface of the rotary disk plate 5 are inclined by $\Delta\xi$ relative to each other will now be described with reference to FIGS. 6 and 7. The angle of incidence and the azimuth of incidence of the light beam R1 onto the rotary disk plate 5 fluctuate with the rotation of the rotary disk plate 5 and therefore, the angle of emergence $\theta_5$ and the azimuth of emergence $\phi_5$ of the +1st-order diffracted light (R1+) emerging from the point M2 also fluctuate. When as shown, for example, in FIG. 6, the normal to the rotary disk plate 5 is at a position c, the parameters $\theta_1$ and $\phi_1$ of the incident light beam R1 in the coordinates system (t, r, z) are $\theta_1 = \theta_0$, $\phi_1 = 0$, but the values of the angle $\alpha_{11}$ formed between the optical path L1 and the coordinates axis $t_1$, the angle $\beta_{11}$ formed between the optical path L1 and the coordinates axis $r_1$ and the angle $\gamma_{11}$ formed between the optical path L1 and the coordinates axis $z_1$ are $$\alpha_{11} = 90 - \theta_1 \quad (11)$$

$$\cos\beta_{11} = \sin\alpha_{11} \cdot \sin\Delta\xi \quad (12)$$

$$\cos\gamma_{11} = \sin\alpha_{11} \cdot \cos\Delta\xi \quad (13)$$

and therefore, the parameters of the incident light beam in the coordinates system ($t_1$, $r_1$, $z_1$) are $$\theta_{11} = \cos^{-1}(\sin\alpha_{11} \cdot \cos\Delta\xi)$$

$$\phi_{11} = \tan^{-1}(\cos\beta_1/\cos\alpha_{11}).$$

Here, assuming that the center of deflection is at the center of the rotary disk plate 5, the position of incidence of the light beam R1 onto the rotary disk plate 5 is a point M11 deviating by $\Delta x [= r \cdot \tan\Delta\xi \tan\theta_1]$ and $\Delta y [= r(1/\cos\Delta\xi - 1)]$ and the position of incidence of the light beam R2 is a point M12 deviating by $-\Delta x$ and $\Delta y$ and therefore, the parameters of the incident light beam in the coordinates system ($t_2$, $r_2$, $z_2$) centered about the point of incidence M11 of the light beam R1 are $$\theta_{12} = \theta_{11}$$

$$\phi_{12} = \phi_{11} - \tan^{-1}\{\Delta x/(\Delta y + r)\}$$

and the values of the angle $\alpha_{12}$ formed with respect to the coordinates axis $t_2$, the angle $\beta_{12}$ formed with respect to the coordinates axis $r_2$ and the angle $\gamma_{12}$ formed with respect to the coordinates axis $z_2$ are $$\cos\alpha_{12} = \sin\theta_{12} \cdot \cos\phi_{12}$$

$$\cos\beta_{12} = \sin\theta_{12} \cdot \sin\phi_{12}$$

$$\gamma_{12} = \theta_{12}$$

and therefore, by substituting the following equations for finding the azimuths of emergence $\alpha_{13}$, $\beta_{13}$ and $\gamma_{13}$ of the +1st-order diffracted light in the coordinates system ($t_2$, $r_2$, $z_2$):

$$\sin(90 - \alpha_{12}) + \sin(90 - \alpha_{13}) = +1 \cdot \lambda/p_1$$

$$\beta_{12} + \beta_{13} = 180$$

$$\gamma_{13} = \cos^{-1}\{(1 - \cos^2\alpha_{13} - \cos^2\beta_{13})^{\frac{1}{2}}\}$$

for these, $\alpha_{13}$, $\beta_{13}$ and $\gamma_{13}$ may be calculated. Here, when $\Delta\xi$ is approximate to 0 and the angle of incidence of the light beam R1 at the point M1 is designed at $\theta_0[= \sin^{-1}\{\lambda \cdot N/(2\pi r)\}]$, $\alpha_{13}$, $\beta_{13}$ and $\gamma_{13}$ may be corrected to parameters $\alpha_{14}$, $\beta_{14}$ and $\gamma_{14}$ as follows:

$$\alpha_{14} = \alpha_{13}$$

$$\cos\beta_{14} = \cos\Delta\xi \cdot \cos\beta_{13} - \sin\Delta\xi \cos\gamma_{13}$$

$$\cos\gamma_{14} = \sin\Delta\xi \cdot \cos\beta_{13} + \cos\Delta\xi \cos\gamma_{13},$$

and may be corrected to $\theta_5$ and $\phi_5$ as follows:

$$\theta = \gamma_{14}$$

$$\phi_5 = \tan^{-1}(\cos\beta_{14}/\cos\alpha_{14})$$

$$\quad\quad (\alpha_{14} < 90)$$

$$= \tan^{-1}(\cos\beta_{14}/\cos\alpha_{14}) + 180$$

$$\quad\quad (\alpha_{14} > 90)$$

$$= 90 \quad (\alpha_{14} = 90, \beta_{14} < 90)$$

$$= -90 \quad (\alpha_{14} = 90, \beta_{14} > 90).$$

Figure 6:
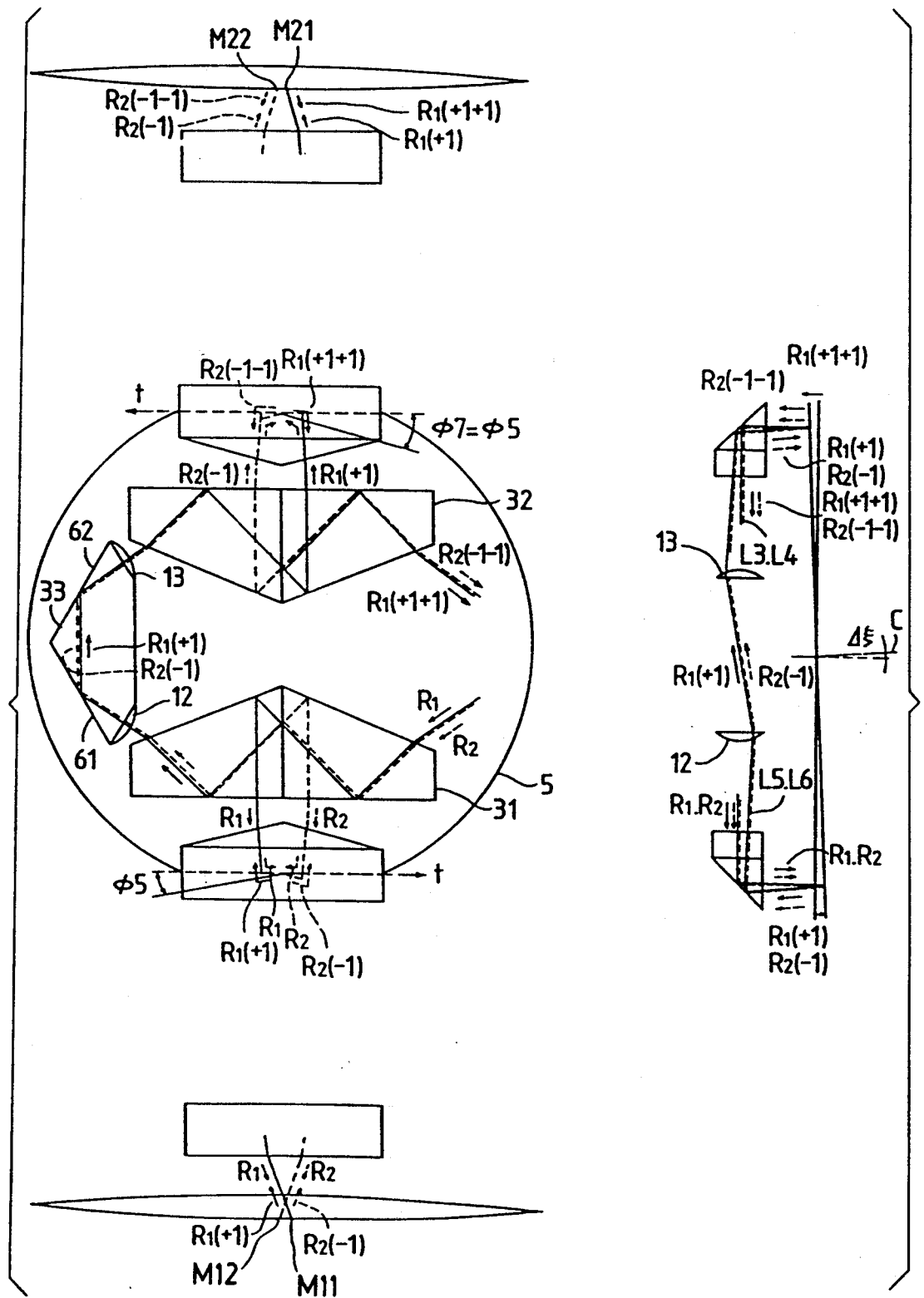
Figure 7:
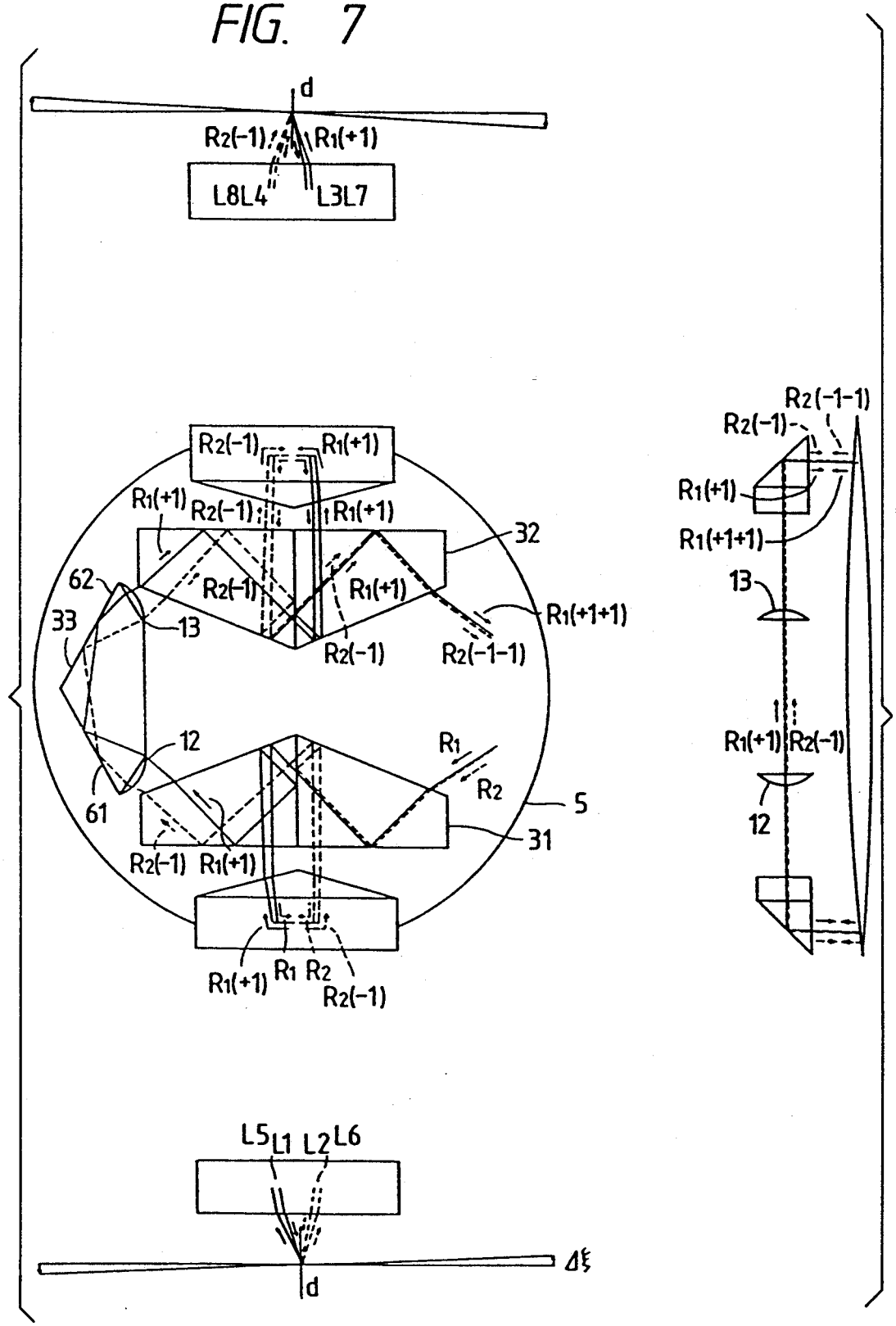

Calculating these, as shown in FIG. 6, the angle formed with respect to the t axis when the optical path L5 of the +1st-order diffracted light (R1+) of the light beam R1 is projected onto the grating arrangement surface of the rotary disk plate 5 deviates by $\phi_5$, and when that light beam is incident on a point M21, the angle formed with respect to the t axis when the optical path L7 of the incident light beam is projected onto the grating arrangement surface of the rotary disk plate 5 also becomes $\phi_7 = \phi_5$ due to a combination of the lens 12, the lens 13, the mirror 64, the mirror 65 and other reflecting surfaces and therefore, the angle formed with respect to the t axis when the +1st-order diffracted light (R1++) of that light beam is projected onto the surface of the disk is restored to 0. That is, the azimuth of travel (the direction of emergence) of the +1st-order diffracted light (R1++) emerging from the point M21 becomes parallel to the optical path L3. Likewise, the optical path of the −1st-order diffracted light (R2−−) which emerges from a point M22 after the −1st-order diffracted light (R2−) of the light beam R2 emerges from the point M12 and is incident on the point M22 becomes parallel to the optical path L4.

Next, when the normal to the rotary disk plate 5 is at a position d, the parameters $\theta_1$ and $\phi_1$ of the incident light beam in the coordinates system (x, y, z) are $$\theta_1 = \theta_0$$

$$\phi_1 = 0,$$

but the values of the angle $\alpha_{11}$ formed between the optical path L1 and the coordinates axis $t_1$, the angle $\beta_{11}$ formed between the optical path L1 and the coordinates axis $r_1$ and the angle $\gamma_{11}$ formed between the optical path L1 and the coordinates axis $z_1$ are $$\alpha_{11} = 90 - \theta_1 + \Delta\xi$$

$$\beta_{11} = 90$$

$$\gamma_{11} = \theta_1 - \Delta\xi$$

and therefore, the parameters of the incident light beam in the coordinates system ($t_1$, $r_1$, $z_1$) are $$\theta_{11} = \theta_1 - \Delta\xi$$

$$\phi_{11} = 0.$$

Assuming here that the center of deflection is at the center of the rotary disk plate 5, the position of incidence of the light beam R1 onto the rotary disk plate 5 is coincident with M1 and therefore, the azimuths of emergence $\theta_{12}$ and $\phi_{12}$ of the +1st-order diffracted light (R1+) of the light beam R1 are $$\sin\theta_{11} + \sin\theta_{12} = +1\cdot\lambda/P$$

$$\phi_{12} = 0,$$

that is, $$\begin{aligned}\theta_{12} &= \sin^{-1}(+1\cdot\lambda/P - \sin\theta_{11})\\ &= \sin^{-1}\{2\cdot\sin\theta_1 - \sin(\theta_1 - \Delta\xi)\}\\ &= \theta_1 + \Delta\xi\end{aligned}$$

and therefore, the azimuths of emergence $\theta_5$ and $\phi_5$ in the coordinates system (t, r, z) are $$\begin{aligned}\theta_5 &= \theta_{12} + \Delta\xi\\ &= \theta_0 + 2\cdot\Delta\xi\\ \phi_5 &= 0.\end{aligned}$$

Likewise, azimuths of emergence of the −1st-order diffracted light of the light beam R2 are $$\theta_6 = \theta_0 - 2\cdot\Delta\xi$$

$$100\ _6 = 0.$$

Due to a combination of the lens 12, the lens 13, the mirror 64, the mirror 65 and other reflecting surfaces, the azimuths of incidence $\theta_7$ and $\phi_7$ of the optical path L7 of the light beam (R1+) incident on the point M2 are $$\theta_7 = \theta_5$$

$$\phi_7 = 0$$

and the azimuths of incidence in the coordinates system (t3, r3, z3) are $$\theta_{13} = \theta_7 + \Delta\xi - \theta_0 + 3\cdot\Delta\xi$$

$$\phi_{13} = 0$$

and therefore, calculating the azimuths of emergence $\phi_{14}$ and $\phi_{14}$ of the 1st-order diffracted light (R1++) emerging from M2 by the use of a calculation equation for the angle of diffraction, $$\theta_{14} = \theta_0 + \Delta\xi$$

$$\phi_{14} = 0$$

and since the azimuths of emergence $\theta_{++}$ and $\phi_{++}$ in the coordinates system (t, r, z) are $$\theta_{++} = \theta_3 = \theta_0$$

they completely coincide with the optical path L3. By a similar calculation, the azimuths of emergence of the −1st-order diffracted light (R2−−) emerging from the point M2 after the −1st-order diffracted light (R2−) is incident on the point M2 are $$\theta_{--} = \theta_0$$

$$\phi_{--} = 0$$

and completely coincide with the optical path L4.

Thus, even if there is an error of the mounted position of the rotary disk plate 5 or a variation in the oscillation wavelength of the light source 1 and the travel path of the diffracted light emerging from the first position (M1) on the rotary disk plate 5 deviates, the second position (M2) on the rotary disk plate 5 on which the diffracted light is again incident does not fluctuate owing to the optical system (12, 13, 64, 65) of the present invention and therefore, deterioration of measurement accuracy which would otherwise result from the fluctuation of the reference position for the reading of the diffraction grating does not occur in principle and further, by constructing the apparatus so that the azimuths of travel (the directions of emergence) of the diffracted lights to be superposed one upon the other which emerge from the second position (M2) may be kept constant, the interference fringe pattern formed by the two diffracted lights is not disturbed. Accordingly, the reading of the diffraction grating can be effected stably.

Also, in the embodiment of FIG. 2, the optical paths of the ±1st-order diffracted lights (R1+ and R2−) between the polarizing beam splitter surfaces 41 and 42 are made substantially common to each other and therefore, even though a construction is adopted in which the light beams R1 and R2 are drawn around over a long optical path leading from the point M1 to the point M2, the fluctuation of the difference in the length of the optical path between the light beams attributable to a change in the ambient temperature or the like is small. Thus, only signals accurately conforming to the rotation of the rotary disk plate 5 are output from the light receiving elements S1 and S2 without being affected by a temperature change or the like. Also, in the present embodiment, the optical system is preset so that the lengths of the optical paths of the light beams R1 and R2 mutually forming an interference light may be equal to each other.

In the foregoing description of the embodiments, the +1st-order and the −1st-order are used as the order numbers of the diffracted light, but in the present invention, as shown in FIGS. 14A and 14B, the signs ± are such that the sign in which the direction of movement of the diffraction grating 5 and the direction in which the azimuth of travel of the light beam is deviated coincide with each other is + and the opposite case is −. Incidentally, FIG. 14A schematically represents the states of the incident light and the diffracted light in the example of the prior art shown in FIG. 15, and FIG. 14B represents the states of the incident light (R2) and the diffracted light in the first embodiment of FIG. 1. As is apparent from the comparison between these two figures, in the example of the prior art, use is made of the ±1st-order diffracted lights emerging toward an optical path entirely deviating from the optical path of the incident light, whereas in the present invention, use is made of the −1st-order diffracted light emerging toward an optical path substantially identical to (or near) the optical path of the incident light. The adoption of such a form gives birth to the aforedescribed effect. The order number 1 of the diffracted light used in the encoder of each of the above-described embodiments is an example to the last, and of course, 2nd-order or greater order may also be used. Also, if 2nd-order or greater order diffracted lights are used in each of the above-described embodiments, detection of displacement in which the resolving power is further enhanced will become possible. This also applies to the other embodiments which will be described later.

In the above-described embodiments, reflected diffracted lights are used as the diffracted lights for forming an interference light. Accordingly, a diffraction grating of high reflectance is useful as the diffraction grating. The diffraction grating used in each of the above-described embodiments is a so-called amplitude type diffraction grating in which light reflecting portions formed of chromium or like material are periodically arranged on a glass substrate, but alternatively, use may be made of a so-called phase type diffraction grating in which periodical grooves are formed on glass or plastic and metallic reflecting film of Al or like material is formed on the uneven portion. Such phase type diffraction grating is excellent in mass productivity and can enhance the diffraction efficiency of ±1st-order diffracted lights and therefore, it is suitable for the encoder of the present invention.

Figure 8:
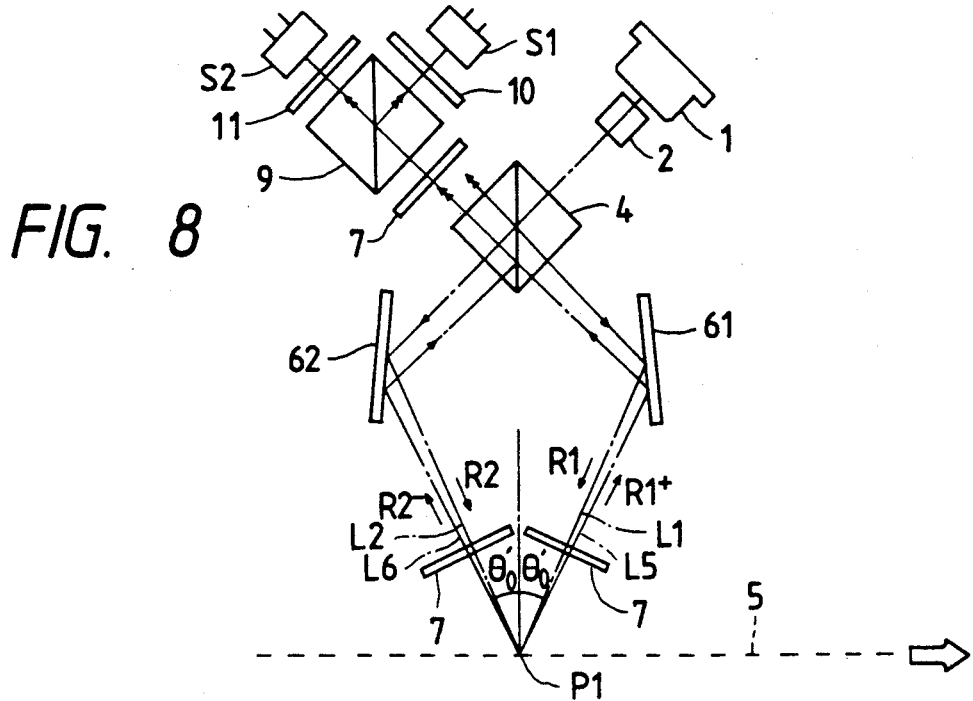
FIGS. 8 and 9 show modifications of the embodiments of FIGS. 1 and 2.
Figure 9:
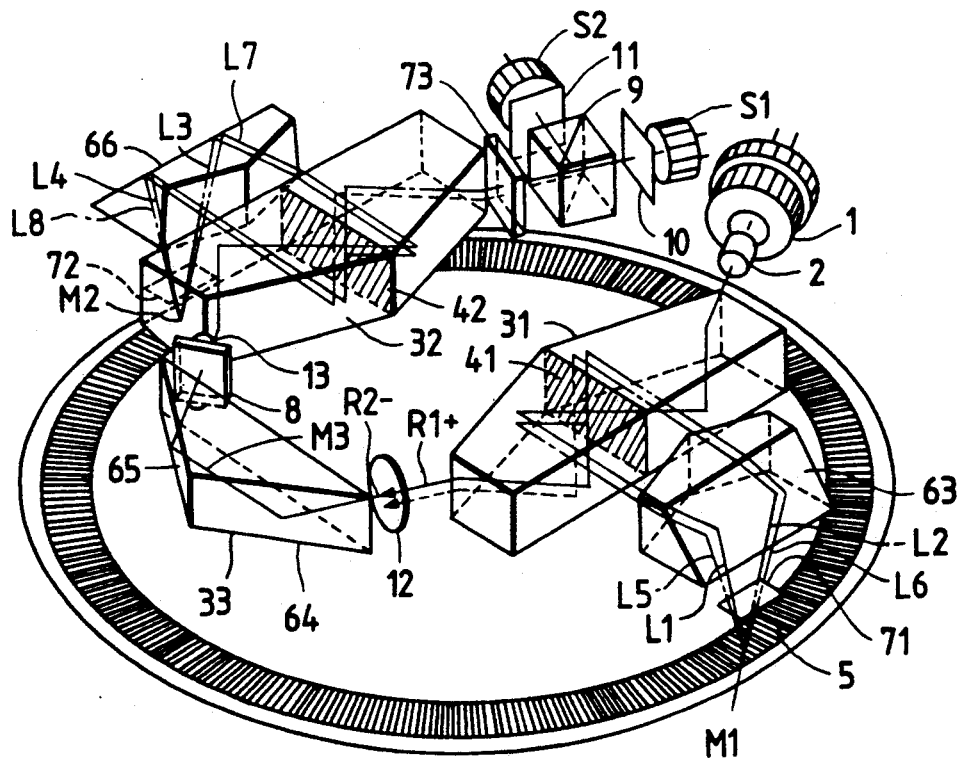

FIGS. 8 and 9 show a modified form in which the optical path of the optical system in the embodiment of FIGS. 1 and 2 is partly changed.

In FIG. 8, the angles of incidence of light beams R1 and R2 incident on the diffraction grating are slightly changed from those in the case of FIG. 1 and forward optical paths (L1, L2) and backward optical paths (L5, L6) are slightly deviated from each other, and the basic structure of this optical system is equal to that of the optical system of FIG. 1. In FIG. 1, the +1st-order reflected diffracted light of the light beam R1 emerging from the point Pl and the regularly reflected light (the 0-order diffracted light) of the light beam R2 travel along the same optical path L1 and depending on the difference between the planes of polarization thereof, only the +1st-order diffracted light of the light beam R1 ought to be selectively reflected by the polarizing beam splitter 4, but depending on the incompleteness of optical parts, the regularly reflected light of the light beam R2 is also slightly reflected by the polarizing beam splitter 4 and is directed to the light receiving elements S1 and S2, and becomes ghost light (noise). Also, if the regularly reflected light (the 0-order diffracted light) of the light beam R1 is even slightly transmitted through the polarizing beam splitter 4 via the optical path L2 of the −1st-order reflected diffracted light, it will likewise become ghost light. So, if the optical paths are set as shown by L1, L2, L5 and L6 in FIG. 8, the optical path of the above-mentioned ghost light and the optical path of a desired diffracted light forming an interference light will deviate from each other and therefore, the incidence of the ghost light onto the light receiving elements S1 and S2 can be avoided.

In FIG. 9, the angles of incidence of light beams R1 and R2 incident on the rotary disk plate 5 are slightly changed from those in the case of FIG. 2 and forward optical paths (L1, L2, L3, L4) and backward optical paths (L5, L6, L7, L8) are slightly deviated from one another and basically, use can be made of the entirely same optical parts as those in the encoder of FIG. 2. In FIG. 2, the +1st-order diffracted light (R1+) of the light beam R1 emerging from the point M1 and the regularly reflected light (the 0-order diffracted light) of the light beam R2 travel along the same optical path L1 and depending on the difference between the planes of polarization thereof, only the +1st-order diffracted light (R1+) of the light beam R1 ought to be reflected by the polarizing beam splitter surface 41. But depending on the incompleteness of optical parts, part of the regularly reflected light of the light beam R2 is also reflected by the polarizing beam splitter surface 41 and is transmitted and therefore ghost light (noise) may be created in some cases as described above. This also holds true of the regularly reflected light (the 0-order diffracted light) of the light beam R1, the regularly (the 0-order rediffracted light) of the light beam (R1+) emerging from the point M2, and the regularly reflected light (the 0-order rediffracted light) of the light beam (R2−). However, if the optical paths are set as shown by L1, L2, L5, L6, L3, L4, L7 and L8 in FIG. 9, the optical path of the above-mentioned ghost light will deviate from the optical path of the diffracted light forming an interference light and therefore, the incidence of the ghost light onto the light receiving elements S1 and S2 can be avoided.

Figure 10A:
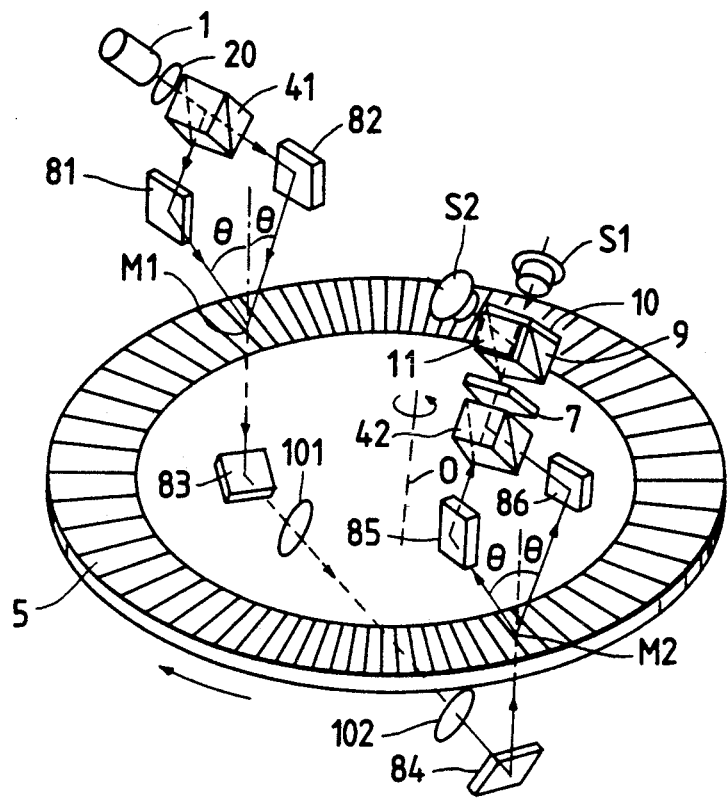
FIGS. 10A and 10B and FIG. 11 show further embodiments of the present invention.
Figure 10B:
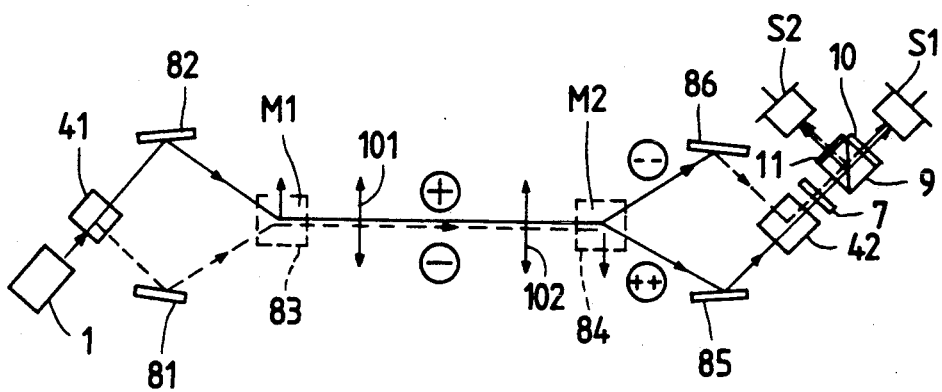

FIG. 10A is a perspective view of another embodiment of the present invention, and FIG. 10B is a developed view of the optical paths in the embodiment of FIG. 10A. In FIGS. 10A and 10B, the reference numeral 1 designates a semiconductor laser, the reference numeral 20 denotes a collimator lens, the reference numeral 5 designates a rotary scale in which a light transmitting type diffraction grating is formed along the direction of rotation, the reference numerals 41 and 42 denote polarizing beam splitters, the reference characters S1 and S2 designate light receiving elements, the reference numerals 81 and 82 denote reflecting mirrors, the reference numeral 7 designate a quarter wavelength plate, the reference numeral 9 denotes a beam splitter, and the reference numerals 10 and 11 designate polarizing plates whose azimuths of polarization deviate by 45° from each other. The azimuth of the rectilinearly polarized light of the laser 1 forms an angle of 45° with respect to the azimuth of polarization of the polarizing beam splitter 41. A light beam emitted from the laser 1 is collimated by the collimator lens 20, whereafter it is equally divided into a transmitted light beam (P-polarized light) and a reflected light beam (S-polarized light) by the polarizing beam splitter 41. The divided two light beams are incident on a position M1 on the radial diffraction grating of the rotary scale 5 at an angle (an angle of diffraction) expressed by $\theta$ of the following equation (1):

$$\theta = \sin^{-1} \lambda/p \qquad (1)$$

where $\lambda$ is the oscillation wavelength of the laser 1, and p is the grating pitch of the diffraction grating of the rotary scale 5 at the position M1. The planes of incidence of the two light beams incident on the position M1 are planes parallel to the direction of grating arrangement (the tangential direction) of the diffraction grating 2 at the position M1.

The ±1st-order transmitted diffracted lights by the above-described two light beams created at the position M1 emerge from the rotary scale 5 in a direction perpendicular to the grating arrangement surface of the diffraction grating. These ±1st-order diffracted lights are reflected at right angles (in parallelism to the grating arrangement surface) by a reflecting mirror 83, and are directed through lenses 101 and 102 to a reflecting mirror 84 disposed at a position substantially symmetrical with respect to the axis of rotation O of the rotary scale 5. This reflecting mirror 84 causes the ±1st-order diffracted lights to be again incident on a position M2 on the diffraction grating of the rotary scale 5 perpendicularly from the same direction. At the position M2, the ±1st-order diffracted lights emerge again therefrom at the angle θ of the equation (1). These ±1st-order rediffracted lights are reflected by reflecting mirrors 85 and 86, whereafter they enter the polarizing beam splitter 42 and overlap with each other, and pass through the quarter wavelength plate 7, whereafter the overlapping light is divided into two light beams by the beam splitter 9, and these light beams enter the light receiving elements S1 and S2 through the polarizing plates 10 and 11. Thus, a sine wave signal resulting from the interference between the ±1st-order rediffracted lights is obtained from the light receiving elements S1 and S2.

Figure 16A:
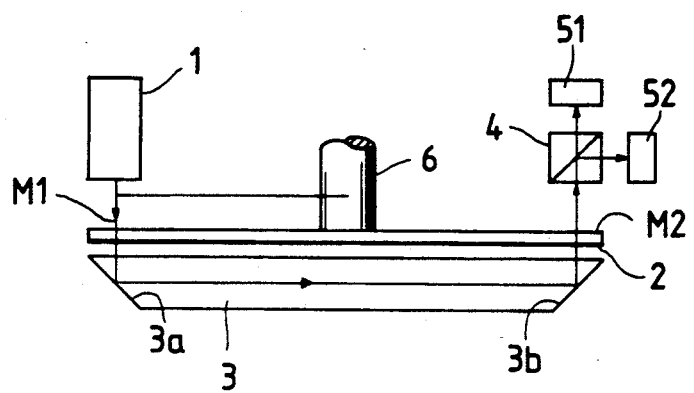
Figure 16B:
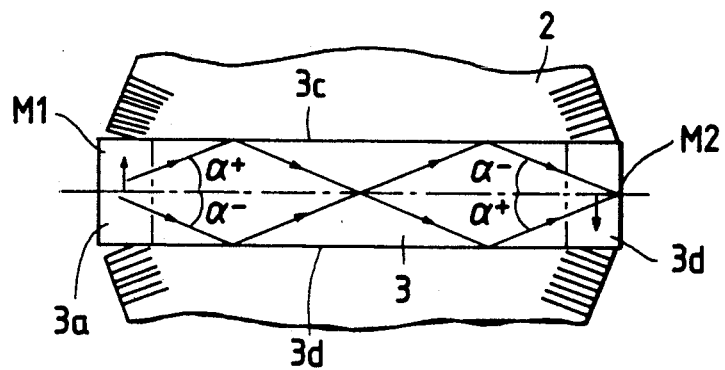

The optical paths of the ±1st-order diffracted lights will now be described with reference to the developed view of the optical paths of FIG. 10B. In FIG. 10B, a 1st-order diffracted light resulting from a transmitted light beam (a light beam indicated by a solid line) transmitted through the polarizing beam splitter 41 being incident on the position M1 on the diffraction grating and emerging in a perpendicular direction from the grating arrangement surface of the diffraction grating is defined as +1st-order diffracted light. In addition, a 1st-order diffracted light resulting from a reflected light beam (a light beam indicated by a broken line) reflected by the polarizing beam splitter 41 being incident on the position M1 and emerging in a perpendicular direction from the grating arrangement surface of the diffraction grating is defined as −1st-order diffracted light. The ±1st-order diffracted lights created at the position M1 overlap with each other, and from the position M1 to a position M2, the ±1st-order diffracted lights follow a common optical path by an optical system comprising reflecting mirrors 83 and 84 and lenses 101 and 102. At the position M2, ±1st-order diffracted lights are again created for these ±1st-order diffracted lights, respectively, and by the action of the polarizing beam splitter 42, only the light beams indicated by a solid line and a broken line in FIG. 10B enter the light receiving elements 7 S1 and S2. That is, when the +1st-order diffracted light (the light beam +, p indicated by a solid line) of the p-polarized light from the position M1 is incident on the position M2, ±1st-order diffracted lights are again created, and the +1st-order diffracted light (the light beam ++ indicated by a solid line) is reflected by the reflecting mirror 85, is transmitted through the polarizing beam splitter 42 and enters the light receiving elements S1 and S2. However, the −1st-order diffracted light (not shown) is reflected by the reflecting mirror 86 and is transmitted through the polarizing beam splitter 42 and therefore does not enter the light receiving elements S1 and S2. On the other hand, of the ±1st-order diffracted lights created by the −1st-order diffracted light (the light beam −, s indicated by a broken line) of the s-polarized light from the position M1 being incident on the position M2, the −1st-order diffracted light (the light beam—indicated by a broken line) is reflected by the reflecting mirror 86, reflected by the polarizing beam splitter 42 and enters the light receiving elements S1 and S2. However, the +1st-order diffracted light (not shown) is reflected by the reflecting mirror 85 and thereafter reflected by the polarizing beam splitter 42 and therefore, does not enter the light receiving elements S1 and S2. Thus, the light (the light beam indicated by a solid line) subject twice to +1st-order diffraction and the light (the light beam indicated by a broken line) subjected twice to 1st-order diffraction overlap with each other and emerge from the polarizing beam splitter 42, and become two interference lights through the quarter wavelength plate 7, the beam splitter 9 and the polarizing plates 10 and 11, and these interference lights enter the light receiving elements S1 and S2, respectively. From the light receiving elements S1 and S2, a sine wave signal corresponding to 4N periods is obtained per one full rotation of the rotary scale 5, as in the example of the prior art shown in FIG. 16. Also, the light beam emerging from the polarizing beam splitter 42 passes through the quarter wavelength plate 7 and becomes a rectilinearly polarized light whose azimuth of polarization rotates with the rotation of the rotary scale 5, as in the previously described embodiments, but since the azimuths of polarization of the polarizing plates 10 and 11 are deviated by 45° from each other, there are obtained signals which are 90° out of phase with each other from the light receiving elements S1 and S2.

In the embodiment of FIG. 10, the optical paths of the ±1st-order diffracted lights which lead from the position M1 to the position M2 on the diffraction grating of the rotary scale 5 are a common optical path, and it is difficult for a measurement error to occur for any environmental change such as any change in the ambient temperature. Also, assembly and adjustment are easy because said optical path is not a complicated optical path as shown in the example of the prior art of FIG. 16 wherein the diffracted lights are made to intersect each other. Also, the lenses 101 and 102 disposed in the common optical path are set so as to render the positions M1 and M2 conjugate with each other, and an effect similar to that of the previously described embodiment can be obtained.

Figure 11:
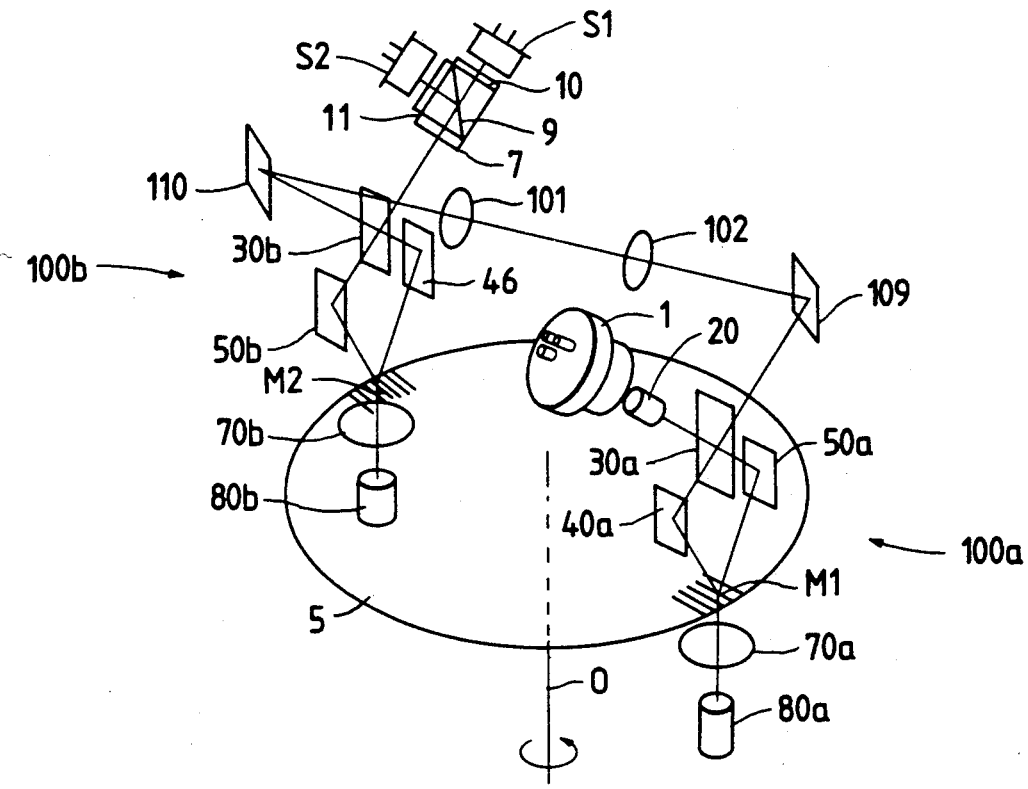

FIG. 11 is a schematic view of still another embodiment of the present invention.

In FIG. 11, the reference numeral 1 designates a semiconductor laser, and the reference numeral 20 denotes a collimator lens for collimating the light beam from the laser 1. The reference character 30a (30b) designates a polarizing beam splitter which reflects S-polarized light of the incident light beam and transmits P-polarized light therethrough. The reference characters 40a (40b) and 50a (50b) denote mirrors, and the reference numeral 5 designates a rotary scale on which a radial diffraction grating is formed.

The mirrors 40a (40b) and 50a (50b) are adapted so that the two light beams from the polarizing beam splitter 30a (30b) may be incident on the diffraction grating at angles corresponding to the angles of diffraction of diffraction order numbers of different signs, e.g. the angles of diffraction of +1st and −1st diffraction order numbers. The reference character 70a (70b) designates polarizing converter means comprising a quarter wavelength plate. The reference character 80a (80b) denotes reflecting means comprising, for example, a mirror or an optical member having reflecting film applied to the end surface of an index gradient lens of the end surface imaging type.

In the present embodiment, there are provided two detecting units 100a (100b) having elements corresponding to the reference characters 30a (30b), 40a (40b), 50a (50b), 70a (70b) and 80a (80b).

Description will now be made of the detecting operation of the rotary encoder according to the present embodiment.

The laser beam from the laser 1 is collimated by the collimator lens 20, and is divided into two light beams, i.e., P-polarized light and S-polarized light, by the polarizing beam splitter 30a. Of these light beams, the S-polarized light reflected by the polarizing beam splitter 30a is reflected by the mirror 40a, and is incident on a position M1 on the diffraction grating surface of the rotary scale 5 at an angle corresponding to the angle of the 1st-order diffraction.

On the other hand, the P-polarized light transmitted through the polarizing beam splitter 30a is reflected by the mirror 50a, and is incident on the position M1 on the diffraction grating surface of the rotary scale 5 at an angle corresponding to the angle of −1st-order diffraction.

The S-polarized light subjected to the 1st-order diffraction by the diffraction grating is transmitted and emerges substantially perpendicularly from the grating arrangement surface, passes through the quarter wavelength plate 70a as the polarizing converter means and becomes a circularly polarized light, and is reflected by the reflecting means 80a and becomes a circularly polarized light whose direction of polarization has been reversed, and returns to the original optical path. It again passes through the quarter wavelength plate 70a, and is again incident as P-polarized light on the position M1 on the diffraction grating. The 1st-order P-polarized light rediffracted by the diffraction grating is reflected by the mirror 40a, and passes through the polarizing beam splitter 30a.

On the other hand, the P-polarized light subjected to the −1st-order diffraction by the diffraction grating is transmitted and emerges substantially perpendicularly from the grating arrangement surface, and passes through the quarter wavelength plate 70a and becomes a circularly polarized light, and is reflected by the reflecting means 80a and becomes a circularly polarized light whose direction of polarization has been reversed, and returns to the original optical path.

It again passes through the quarter wavelength plate 70a, and is again incident as an S-polarized light beam on the position M1 on the diffraction grating. The −1st-order S-polarized light rediffracted by the diffraction grating is reflected by the mirror 50a, and is reflected by the polarizing beam splitter 30a.

Thereby, the P-polarized light beam and the S-polarized light beam are caused to overlap with each other by the polarizing beam splitter 30a and is taken out, and these two light beams are directed to a mirror 109. The two light beams directed to the mirror 109 have their planes of polarization overlapped with each other orthogonally to each other, and these two light beams reflected by the mirror 109 are reflected by a mirror 110 through lenses 101 and 102, whereafter they are directed to a detecting unit 100b of a construction similar to that previously described. The two light beams are subjected twice to 1st-order diffraction at a position M2 on the diffraction grating in the same manner as by the detecting unit 100a, whereafter they are taken out and are directed to the quarter wavelength plate 7.

The two light beams at this time have their planes of polarization overlapped with each other orthogonally to each other. The phase difference δ between these light beams is the phase difference between a light beam subjected four times to +1st-order diffraction and a light beam subjected four times to −1st-order diffraction and therefore, it is $$\delta = \frac{2\pi x}{P} \times 4 - \left(-\frac{2\pi x}{P} \times 4\right)$$

$$= \frac{16\pi x}{P}.$$

That is, when x=1P (P being the grating pitch), the phase difference between the two light beams is 16π.

The combined wave of the two light beams passed through the quarter wavelength plate 7 becomes a rectilinearly polarized light beam, and the azimuth of polarization thereof makes one-half rotation while the phase difference between the two light beams deviates by 2π and therefore, the light beam passed through the beam splitter 9 and through the polarizing plate 10 causes a variation in the light and shade of one period in the meantime, and is output is an electrical signal of one period from the light receiving element S1.

On the other hand, as regards the light beam reflected by the beam splitter 9, the phase of the periodic variation in the light and shade of the light beam passed through the polarizing plate 11 deviates by 90° because the polarizing plate 11 is disposed with the azimuth of the plane of polarization thereof deviated by 45° relative to the polarizing plate 10. Therefore, the phase of the periodic signal output from the light receiving element S2 always deviates by 90° as compared with the phase of the periodic signal output from the light receiving element S1.

Assuming that the total number of the gratings of the diffraction grating on the rotary scale is N, the variation in the phase difference δ between the two light beams while the scale 5 makes one full rotation is $$\delta = \frac{16\pi x}{P}$$

and by substituting x=NP therefor, $$\delta = 16\pi N.$$

Thus, a periodic signal of 16πN/2π=8N periods (a sine wave signal) is obtained from two light receiving elements 15 and 16.

In the present embodiment, the lenses 101 and 102 are provided in the common optical path of ±1st-order diffracted lights (the optical path leading from the polarizing beam splitter 30a to the polarizing beam splitter 30b) so as to render the positions M1 and M2 on the diffraction grating on the rotary scale 5 conjugate with each other. Accordingly, as in the encoder of each of the previously described embodiments, these lenses constitute a system in which it is difficult for measurement accuracy to be deteriorated by any change in the ambient temperature or the inclination of the rotary scale. Also, in the present embodiment, an interference light is formed by a light subjected four times to +1st-order diffraction and a light subjected four times to −1st-order diffraction and therefore, a resolving power four times as great as that in each of the previously described embodiments is obtained.

The diffraction grating used in the encoder of the present invention may be not only the well-known amplitude type diffraction grating, but also a relief type diffraction grating or a phase type diffraction grating such as a hologram. As regards the light source, the use of a semiconductor laser such as the above-described laser diode is suitable for making the apparatus compact. The semiconductor laser may be selected from among various types such as the single mode type and the multimode type. Of course, the light source is not limited to a semiconductor laser, but may be any other laser source than a semiconductor laser, or an SLD (high luminance infrared light emitting element) having an intermediate nature between a semiconductor laser and a light-emitting diode.

Figure 12:
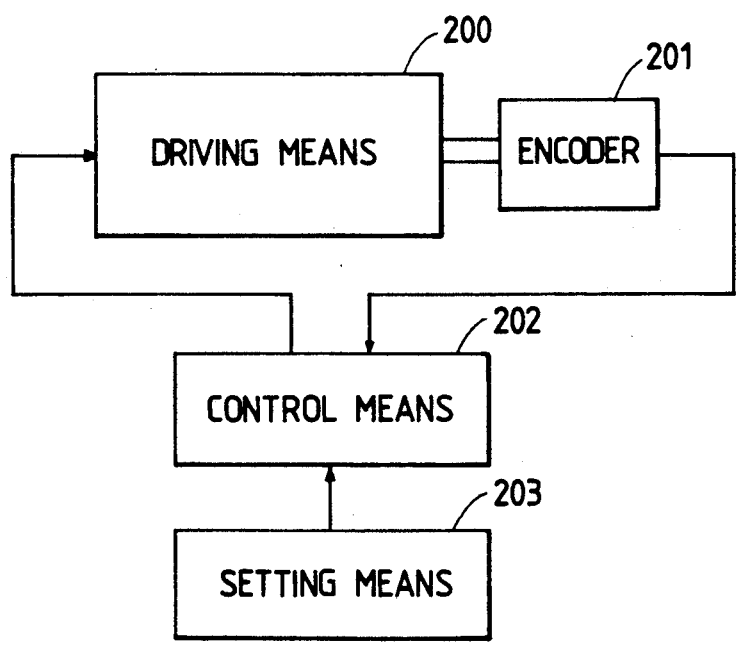
FIG. 12 shows an example in which the encoder of the present invention is applied to a driving system.

FIG. 12 shows an example of the use of the above-described encoder, and is a system construction diagram of a driving system using the encoder. The encoder 201 is connected to the driving output portion of driving means 200 having a drive source such as a motor, an actuator or an internal combustion engine, or to a moving unit for a driven body, and detects the driven states such as the amount of rotation and the speed of rotation or the amount of movement and the speed of movement. The detection output of the encoder 201 is fed back to control means 202, in which a driving signal is transmitted to the driving means 200 so that the state set by setting means 203 may be assumed. By constructing such a feedback system, the driving state set by the setting means 203 can be kept without being affected by disturbance. Such a driving system can be widely applied, for example to a machine tool, a manufacturing machine, a measuring instrument, a recording instrument, a photographing instrument and further, any ordinary apparatus having driving means.

Figure 13:
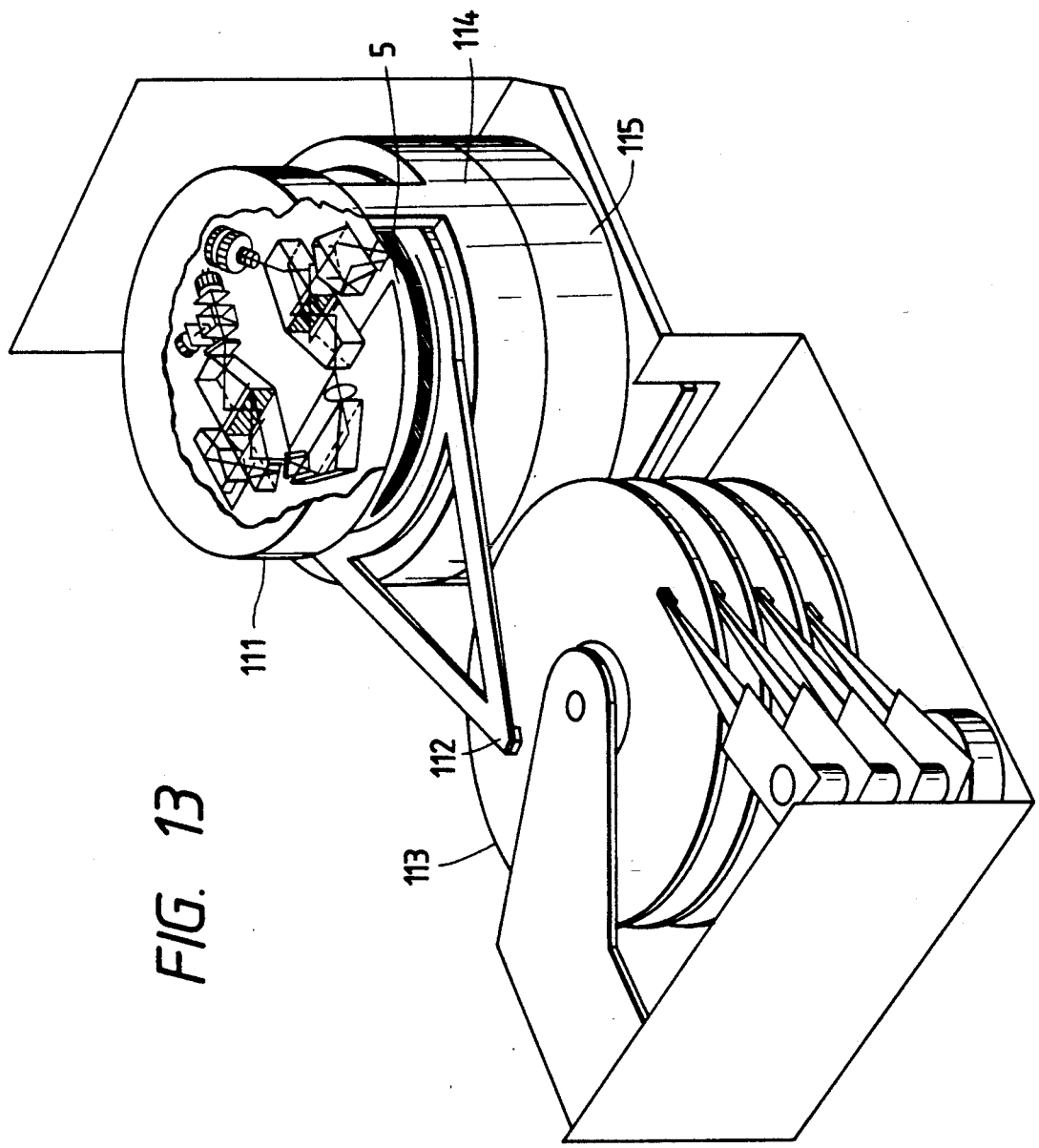
FIG. 13 shows an example in which the encoder of the present invention is utilized in a track signal writing device for a hard magnetic disk.

FIG. 13 shows a specific example in which the above-described driving system is applied to a hard magnetic disk apparatus. The reference numeral 133 designates a magnetic disk surface. The rotary disk plate of the encoder is connected to the rotary shaft (not shown) of a motor 114 for oscillating a writing head 112 for writing a track signal into the magnetic disk surface 133, and the reading head 111 of the encoder is placed over it. The reference numeral 115 denotes an air bearing. Members corresponding to the setting means 203 and control means 202 in FIG. 12 are not shown. By control means, not shown, a driving command is given to the motor 114 which is driving means so that the motor may assume the movement set by setting means, not shown, on the basis of the written-in signal, whereby the writing head 112 is moved. This moved state is detected by an encoder 111, the output of which is fed back to the control means.

As has been described above, the angles of incidence of two light beams incident on the diffraction grating are set appropriately and desired diffracted lights are substantially returned to the original optical paths (the optical paths during the incidence), whereby diffracted lights for forming an interference light can be easily taken out even if the grating pitch of the diffraction grating is of the order of the wavelength of the light. Accordingly, there is realized an encoder of high accuracy and high resolving power. Further, the optical part for directing the lights to the diffraction grating and the optical part for taking out desired diffracted lights created from the diffraction grating can be used in common, and this leads to the effect that the reading optical system of the diffraction grating can be made very simple and compact.

Furthermore, even if the azimuth of travel of each diffracted light emerging from the first point on the diffraction grating is more or less fluctuated by the deviation or the inclination of the mounted position of the scale plate, the second position on the diffraction grating on which each diffracted light is again incident does not fluctuate and therefore, the deterioration of measurement accuracy which would otherwise result from the fluctuation of the reference position for the reading of the grating does not occur in principle. Also, since the diffracted lights have a substantially common optical path, measurement accuracy is not deteriorated by the fluctuation or the like of the ambient temperature. Further, by the apparatus being constructed so that the azimuths of travel (the directions of emergence) of the diffracted lights to be superposed one upon the other which emerge from the second position may be kept constant, the interference fringe pattern formed by two diffracted lights is not disturbed. Accordingly, there can be provided a rotary encoder of high resolving power and high accuracy which can stably effect the reading of the interference signal. Also, there can be easily realized a rotary encoder of the "incorporated type" because it is relatively free from influence for the mounting error of the rotary disk plate and because the rotary disk plate and the light projecting and receiving optical system (the reading optical unit) can be separated from each other.

What is claimed is:

1. A rotary encoder, comprising:

light beam incidence means for emitting a light beam and directing it to a first position M1 on a rotary scale to be diffracted, with the rotary scale having a reflecting type diffraction grating formed along a direction of rotation;

optical means for directing first and second diffracted lights reflected from said first position M1 along a substantially common optical path, and causing the first and second diffracted lights to be incident on a second position M2 on the rotary scale to be rediffracted, said second position M2 being a position substantially point-symmetrical with said first position M1 with respect to a center of rotation of the rotary scale, with said optical means including an optical system for allowing said first position M1 and said second position M2 to be optically conjugate to each other with respect to said optical system;

light detecting means for detecting an interference light formed by rediffracted lights reflected from said second position M2 and outputting a signal; and rotation detecting means for detecting a rotated state of the rotary scale on the basis of the output signal of said light detecting means.

2. A rotary encoder according to claim 1, wherein said light beam incidence means comprises:

a light source emitting light;

a beam splitter for dividing the emitted light into a light beam R1 and a light beam R2;

a first reflecting mirror for reflecting the light beam R1 from said beam splitter and directing it to said first position M1; and a second reflecting mirror for reflecting the light beam R2 from said beam splitter and directed it to said first position M1.

3. A rotary encoder according to claim 1, wherein said optical system includes first and second lenses disposed in the common optical path.

4. A rotary encoder according to claim 1, wherein the first and second diffracted lights are 1st-order diffracted lights.

5. A rotary encoder according to claim 1, wherein the rediffracted lights are 1st-order rediffracted lights.

6. A rotary encoder, comprising:

light beam incidence means for emitting a light beam R1 and a light beam R2 and directing the light beams R1, R2 along first and second light paths, respectively, to a first position M1 on a rotary scale to be diffracted, wit the rotary scale having a reflecting type diffraction grating formed along a direction of rotation, and for causing the light beam R1 and the light beam R2 to be incident on said first position M1 so that a first reflected diffracted light may emerge along an optical path substantially common to the first light path and a second reflected diffracted light may emerge along an optical path substantially common to the second light path, with said light beam incidence means comprising a light source, a beam splitter for dividing light emitted from said light source into the light beam R1 and the light beam R2, a first reflecting mirror for reflecting the light beam R1 from said beam splitter and directing it to said first position M1, and a second reflecting mirror for reflecting the light beam R2 from said beam splitter and directing it to the first position M1;

optical means for directing first and second diffracted lights reflected from said first position M1 along a substantially common optical path, and causing the first and second diffracted lights to be incident on a second position M2 on the rotary scale to be rediffracted, said second position M2 being a position substantially point-symmetrical with said first position with respect to the center of rotation of the rotary scale;

light detecting means for detecting an interference light formed by the rediffracted lights created from said second position and emitting an output signal; and displacement detecting means for detecting a rotated state of the rotary scale on the basis of the output signal of said light detecting means, wherein said optical means causes both of the light beams R1 and R2 to be incident on said diffraction grating at an angle of incident $\Theta_0 \simeq \sin^{-1}(\lambda/2P)$, where $\lambda$ is a wavelength of the light beams R1 and R2, and P is a grating pitch of the diffraction grating.

7. An encoder for measuring displacement of a scale having a reflecting type diffraction grating formed along a direction of displacement, said encoder comprising:

light beam incidence means for emitting at least one light beam and directing it along a light path to a position on the scale to be diffracted;

optical means for directing diffracted light beams reflected from the scale along an optical path substantially common to the light path, wherein said optical means causes the light beam to be incident on the diffraction grating at an angle of incidence $\Theta_0 \simeq \sin^{-1}(\lambda/2P)$, where $\lambda$ is a wavelength of the light beam, and P is a grating pitch of the diffraction grating;

light detecting means for detecting an interference light formed by the diffracted lights and emitting an output signal; and displacement detecting means for detecting a relative displaced state of the scale on the basis of the signal output by said light detecting means.

8. An encoder according to claim 7, wherein said light beam incidence means comprises:

a light source emitting light;

a beam splitter for dividing the emitted light into a light beam R1 and a light beam R2;

a first reflecting mirror for reflecting the light beam R1 from said beam splitter and directing it to a predetermined position on the diffraction grating; and a second reflecting mirror for reflecting the light beam R2 from said beam splitter and directing it to the predetermined position on the diffraction grating, wherein said optical means causes both of the light beams R1 and R2 to be incident on the diffraction grating at an angle of incidence $\Theta_0 \simeq \sin^{-1}(\lambda/2P)$, where $\lambda$ is the wavelength of the light beam R1 and R2, and P is the grating pitch of the diffraction grating.

9. An encoder according to claim 7, wherein said light beam incidence means directs light to a linear type encoder and the diffraction grating is formed along the direction of movement of a rectilinear scale.

10. An encoder according to claim 7, wherein said light beam incidence means directs light to a rotary type encoder and the diffraction grating is formed along the direction of rotation of a rotary scale.

* * * * *

UNITED STATES PATENT AND TRADEMARK OFFICE
CERTIFICATE OF CORRECTION

PATENT NO. : 5,146,085

DATED : September 8, 1992

INVENTOR(S) : Koh Ishizuka, et al.

It is certified that error appears in the above-identified patent and that said Letters Patent is hereby corrected as shown below:

COLUMN 4:

Line 40, "$\theta_0\theta_b[=\sin^{-1}(\lambda/2O)]$" should read --$\theta_0\theta_b[=\sin^{-1}(\lambda/2P)]$--.

COLUMN 6:

Line 38, "mirrors" should read --mirrors 64--.

COLUMN 8:

Line 5, "the path" should read --the common optical path--.
Line 39, "over-lapping" should read --overlapping--.
Line 65, "↓5" should read --$\theta_5$--.

COLUMN 9:

Line 36, "adn" should read --and--.
Line 53, "$(\Delta Ar/r)$" should read --$(\Delta r/r)$--.
Line 58, "$\phi_{11}[=\tan^{-1}(\Delta r/r)]$" should read --$\phi_{11}[=\tan^{-1}(\Delta r/r)]$--.

COLUMN 11:

Line 23, "$\phi_{11}=\tan^{-1}(\cos\beta_1/\cos\alpha_{11})$" should read --$\phi_{11}=\tan^{-1}(\cos\beta_{11}/\cos\alpha_{11})$--.
Line 46, "$\gamma 1^2 = \theta_{12}$" should read --$\gamma_{12} = \theta_{12}$--.

UNITED STATES PATENT AND TRADEMARK OFFICE
CERTIFICATE OF CORRECTION

PATENT NO. : 5,146,085
DATED : September 8, 1992
INVENTOR(S) : Koh Ishizuka, et al.

It is certified that error appears in the above-identified patent and that said Letters Patent is hereby corrected as shown below:

COLUMN 12:

Line 46, "L" should be deleted.

COLUMN 13:

Line 47, "$\phi_{14}$" (first occurrence) should read --$\theta_{14}$--.

COLUMN 15:

Line 25, "grating" should read --grating 5--.

COLUMN 16:

Line 65, "rotation O" should read --rotation 0--.

COLUMN 17:

Line 40, "7" should be deleted.
Line 59, "reflected" should read --is reflected--.
Line 62, "thereafter" should read --is thereafter--.
Line 65, "subject" should read --subjected--.

COLUMN 20:

Line 18, "is" (second occurrence) should read --as--.

UNITED STATES PATENT AND TRADEMARK OFFICE
CERTIFICATE OF CORRECTION

PATENT NO. : 5,146,085    Page 3 of 3

DATED : September 8, 1992

INVENTOR(S) : Koh Ishizuka, et al.

It is certified that error appears in the above-identified patent and that said Letters Patent is hereby corrected as shown below:

COLUMN 23:

Line 8, "wit" should read --with--.

Signed and Sealed this

Eighteenth Day of January, 1994

Attest:

BRUCE LEHMAN

Attesting Officer    Commissioner of Patents and Trademarks